United States Patent [19]
Shinohara

[11] Patent Number: 5,901,139
[45] Date of Patent: May 4, 1999

[54] ATM CELL BUFFER MANAGING SYSTEM IN ATM NODE EQUIPMENT

[75] Inventor: Masayuki Shinohara, Tokyo, Japan

[73] Assignee: NEC Corporation, Japan

[21] Appl. No.: 08/716,973

[22] Filed: Sep. 20, 1996

[30] Foreign Application Priority Data

Sep. 27, 1995 [JP] Japan .................................. 7-249955
Feb. 6, 1996 [JP] Japan .................................. 8-019813

[51] Int. Cl.⁶ .................................................. H04L 12/56
[52] U.S. Cl. .......................... 370/232; 370/253; 370/412
[58] Field of Search ................................... 370/229, 230, 370/232, 233, 234, 235, 252, 253, 395, 398, 399, 412, 413, 414, 415, 416, 417, 418

[56] References Cited

U.S. PATENT DOCUMENTS

| | | | |
|---|---|---|---|
| 5,166,930 | 11/1992 | Braff et al. | 370/235 |
| 5,404,354 | 4/1995 | Hayter et al. | 370/230 |
| 5,455,820 | 10/1995 | Yamada | 370/413 |
| 5,473,604 | 12/1995 | Lorenz et al. | 370/229 |
| 5,509,001 | 4/1996 | Tachibana et al. | 370/230 |
| 5,539,747 | 8/1997 | Ito et al. | 370/235 |
| 5,546,389 | 8/1996 | Wippenbeck et al. | 370/412 |
| 5,689,499 | 11/1997 | Hullett et al. | 370/235 |

OTHER PUBLICATIONS

A. Romanow, et al., "Dynamics of TCP Traffic Over ATM Networks", Computer Communication Review, Proceedings of SIGCOMM '94 on Communications Arctectures, Protocols and Applications, vol. 24, No. 4, Oct., 1994, pp. ix and 79–88.

Primary Examiner—Chi H. Pham
Assistant Examiner—Kwang B. Yao
Attorney, Agent, or Firm—Ostrolenk, Faber, Gerb & Soffen, LLP

[57] ABSTRACT

In an ATM cell buffer managing system in an ATM node equipment, a buffer occupied amount of each individual logical channel of a buffer memory is measured by a buffer occupied amount counting portion, and a threshold value for each individual logical channel is dynamically derived on the basis of the measured buffer occupied amount for making judgement whether an input ATM cell can be received or not per each logical channel. By this, in the buffer memory, effective throughput of upper layer packet level can be improved.

14 Claims, 16 Drawing Sheets

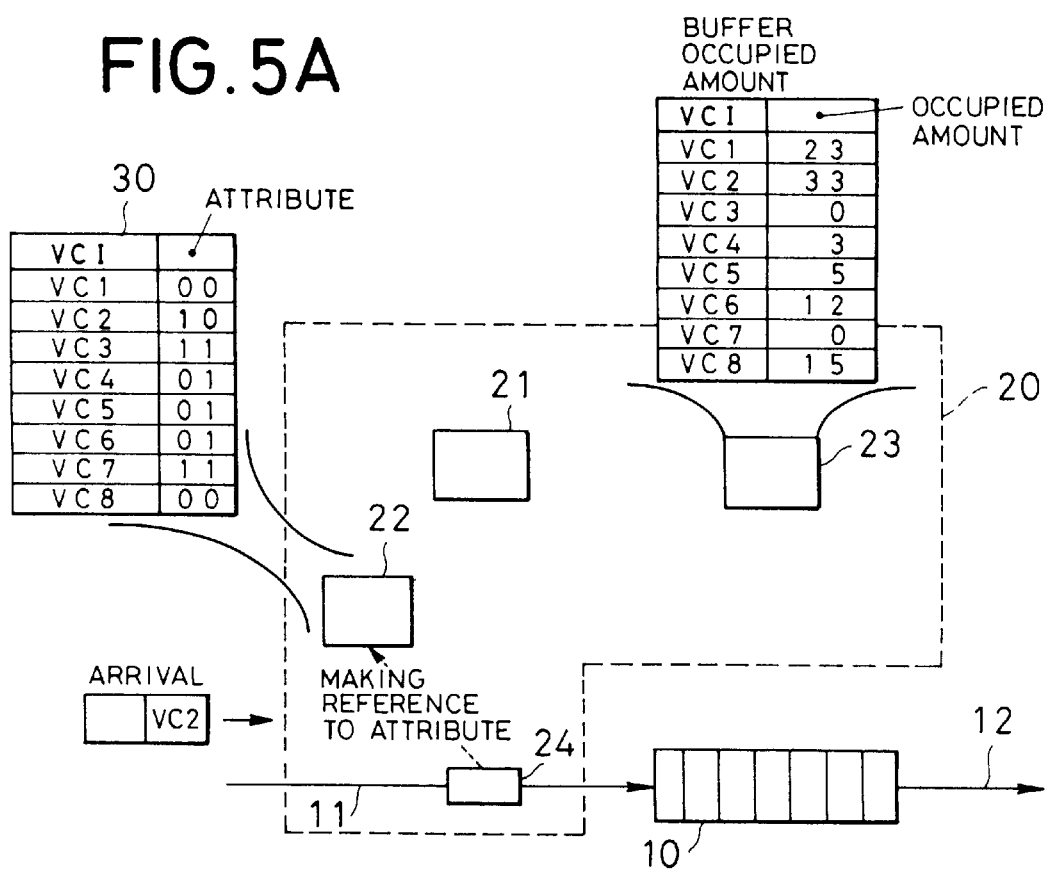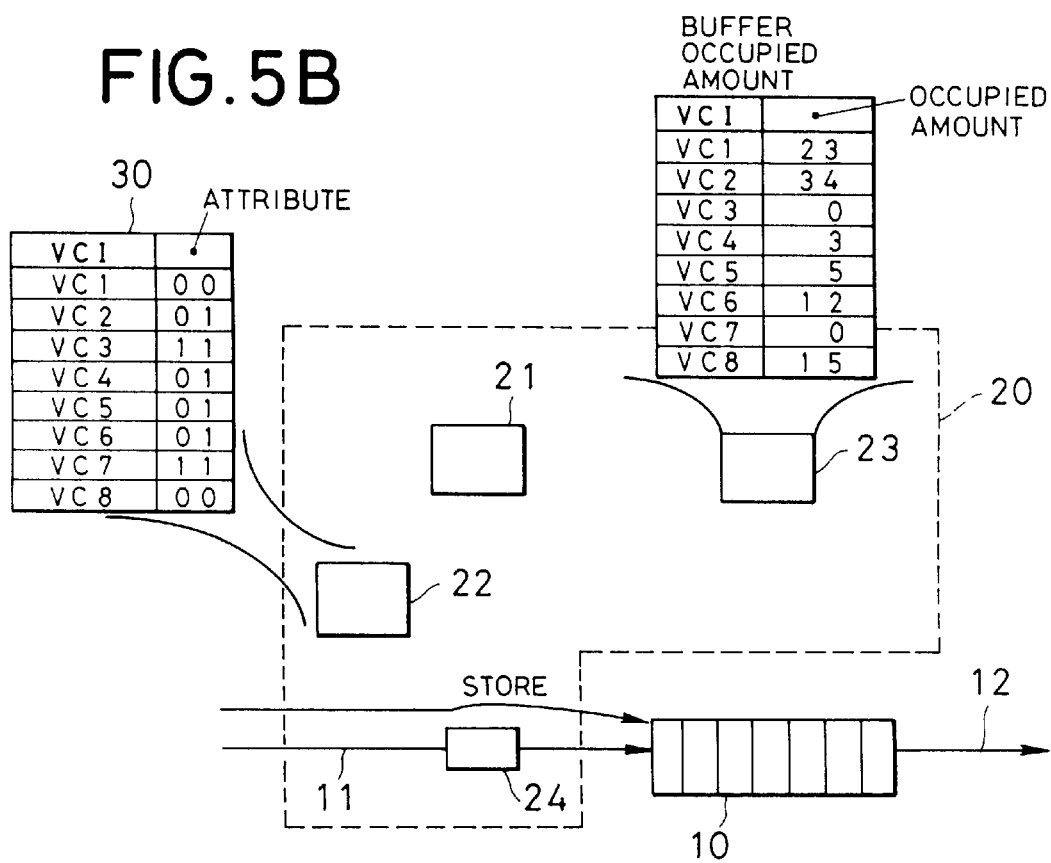

ATM CELL BUFFER MANAGING SYSTEM IN ATM NODE EQUIPMENT

BACKGROUND OF THE INVENTION

1. Field of the Invention

The present invention relates to a buffer managing system in an ATM (asynchronous transfer mode) node equipment having a buffer memory for temporarily storing ATM cells. More specifically, the invention relates to a buffer managing system which can improve an effective throughput of upper layer packet level with a least buffer memory.

2. Description of the Related Art

In an ATM node equipment, such as an ATM switch, a buffer memory for avoiding interference of ATM cells directed to the same output line is employed. The capacity of the buffer memory is finite. When inputs exceeding allowable range are made, the buffer memory should cause overflow to dispose the overflown ATM cells. The upper layer packet having even one drop out cell cannot be utilized by upper protocol layer. Therefore, even when such packet reaches a destination terminal, it is instantly abandoned and re-transmission process is taken place.

It is not at all desirable to accumulate and transmit such packet including lost cell knowing as being useless in the light of effective use of a net work resource. This can be a cause of traffic congestion.

In order to avoid wasting of the net work resource by such useless cells, a selective packet disposing method, in which if a buffer occupied amount at a timing of arrival of a leading cell of an AAL (ATM adaptation larger) packet exceeds a predetermined threshold value, all of the cells from the leading cell to a trailing end cell (EOM (End of Message) cell) forming the AAL packet are abandoned before buffering.

In this selective packet disposing method, a packet disposing management table for managing whether packet is in reception or in disposal per logical channel (VC), becomes necessary. However, in the conventional selective packet disposing method, states provided for one logical channel (VC) are "packet not received" state, "packet in reception" state and "packet in disposal" state.

In this selective packet disposing method, when the EOM cell arrives via the currently used logical channel (VC), the state in the table is set at "packet not received". When the cell other than EOM cell arrives from the logical channel (VC) in the "packet not received" state, the occupied amount of the entire buffer is checked at this timing. If the occupied amount is in excess of the threshold value, the "packet in disposal" state is set in order to forcedly dispose all of the cells arriving through the current logical channel (VC) until the EOM cell arrives.

If the occupied amount is less than or equal to the threshold value, the "packet in reception" state is set to continuously receive the packet until the next EOM cell arrives. A flowchart of the conventional selective packet disposal is shown in FIG. 16.

Next, the operation of the conventional method will be discussed with reference to the flowchart of FIG. 16. At first, when the ATM cell is input to a cell input control portion (G1), the cell disposal managing table is made reference to on the basis of a logical channel identifier (VCI) (G2), and then an attribute registered in the management table is checked (G3). If the attribute is "10" ("packet reception enable" state), the ATM cell is accumulated in the cell buffer as it is (G4). Finally, check is performed whether the arrived cell is the EOM cell or not (G5). If the arrived cell is EOM cell, the state of the corresponding logical channel (VC) is modified to be "01" ("packet not received" state) (G6).

On the other hand, when the attribute as checked at step G3 is "11" ("packet in disposal" state), the ATM cell is forcedly dropped in the cell input control portion (G7). In step G3, if the state of the logical channel (VC) is "01" ("packet not received" state), the arriving ATM cell may be regarded as the leading cell of the upper layer packet.

Therefore, next, the occupied amount of the entire cell buffer is measured at this timing (G8). If the occupied amount Q_total of the entire buffer is less than or equal to the predetermined through value Qth_total (G9), judgement is made that all of the ATM cells of the currently arriving packet may be stored to set the state of the logical channel (VC) at "10" ("packet reception enable" state) (G10). On the other hand, when the occupied amount Q_total of the entire buffer is greater than or equal to the threshold value Qth_ total (G9), the state of the logical channel is set at "11" ("packet in disposal" state) is set (G11) to drop the ATM cells.

In the conventional method as set forth above, selective packet disposal is uniformly performed with respect to all of the logical channels (VC). However, there are some logical channels which has demand to be transmitted the cells as much as possible irrespective of loss of some cells. For such type of logical channel (VC), it is not desirable to effect the selective packet disposal.

Also, in the conventional method, since judgement whether the arriving packet is to be received or disposed is made on the basis of the occupied amount of the entire buffer and the threshold value, it is inclined to packet-by-packet control irrespective of nature of respective of logical channels (VC). Therefore, under the environment where logical channels (VC) having different traffic characteristics are admixed, it is possible to frequency of forced disposal of packet tends to be deviated per logical channels.

SUMMARY OF THE INVENTION

It is, therefore, an object of the present invention to provide an ATM cell buffer managing system which permits selection whether a selective packet disposal is to be applied or not per a logical channel (VC) and can improve concentration of forced disposal per logical channels (VC) under an environment where logical channels having different traffic characteristics are present in admixing manner.

According to the first aspect of the invention, an ATM cell buffer managing system comprises:

buffer memory means for temporarily storing an ATM cell;

cell disposal managing table means for maintaining reception enabling and disabling information indicative whether reception of the ATM cell per each individual logical channel;

buffer occupied amount counting means for measuring occupied amount of an overall buffer of the buffer memory means when the reception enabling and disabling information of the logical channel of input ATM cell indicates reception enabling;

reception control means for receiving the input ATM cell when the buffer occupied amount is less than or equal to a first threshold value; and disposal control means for calculating a second threshold value for the logical channel of the input ATM cell when the buffer occupied amount exceeds the first threshold value and determining disposal or reception of the input ATM cell depending upon a result of comparison of a buffer occupying amount of the logical channel of the input ATM cell and the second threshold value.

According to the second aspect of the invention, an ATM cell buffer managing system in an ATM node equipment having a buffer memory for temporarily storing ATM cells, comprises:

buffer occupied amount counting means for measuring an occupying amount of the ATM cells per each individual logical channel in the buffer memory;

status storage means for storing a cell disposal managing table maintaining attributes indicative whether arriving ATM cell can be received or not per each individual logical channel;

cell input control means for comparing an occupied amount of the overall buffer measured by the buffer occupied amount counting means with a predetermined first threshold value for determining whether the input ATM cell is to be received or disposed, and updating the content of the cell disposal managing table, the cell input control means receiving the input ATM cell when the occupied amount of the overall buffer is less than or equal to the first threshold value, calculating a second threshold value for the logical channel of the ATM cell when the occupied amount of the overall buffer exceeds the first threshold value and determining whether the input ATM cell is to be received or disposed depending upon a comparison of a buffer occupying amount of the logical channel of the input ATM cell and the second threshold value.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIGS. 5A and 5B are explanatory illustration showing a process procedure upon arrival of the ATM cell of the logical channel having an attribute of "10" representative of state of "packet reception enable", in the shown embodiment of the ATM cell buffer managing system according to the invention;

DESCRIPTION OF THE PREFERRED EMBODIMENT

The preferred embodiments of the present invention will be discussed with reference to the drawings. In the following description, numerous specific details are set forth in order to provide a thorough understanding of the present invention. It will be obvious, however, to those skilled in the art that the present invention may be practiced without these specific details.

Figure 1:
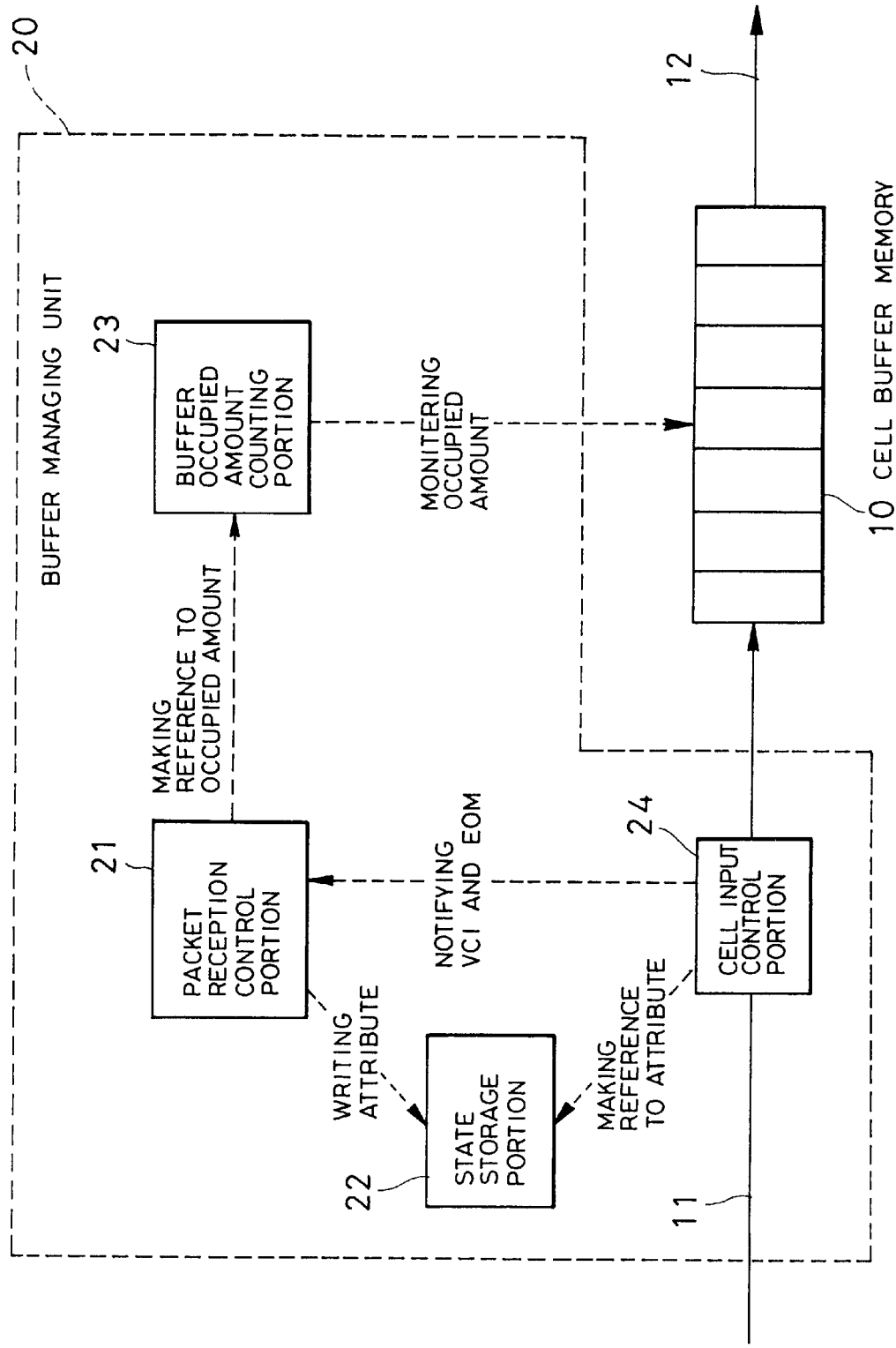
FIG. 1 is a block diagram of the preferred embodiment of an ATM cell buffer managing system according to the present invention.

FIG. 1 is a block diagram of one embodiment of an ATM cell buffer managing system according to the invention. The present invention is applicable for all of ATM associated equipments having cell buffers. Concerning structure of a cell buffer, a buffering architecture, in which FIFO is completely common to all of logical channels, is selected among a plurality of existing buffering architectures. The invention is also applicable for a buffering architecture queuing per each logical channel (VC). In FIG. 1, a portion 20 surrounded by a broken line is the preferred embodiment of the buffer managing unit according to the invention.

The buffer managing unit 20 is constructed with a packet reception control portion 21, a state storage portion 22, in which a cell disposal managing table 30 (hereinafter occasionally referred to as "managing table") shown in FIG. 2, a buffer occupied amount counting portion 23 for monitoring a buffer occupied amount of the cell buffer 10, and a cell input control portion 24.

A cell input control portion 24 checks a cell header of an arrived ATM cell and detects a VCI (VCI identifier). Also, the cell input control portion 24 judges whether an ATM cell is an EOM (End of Message) cell indicative of end of an AAL (ATM Adaptation Layer) packet, and send a result of the judgement to the packet reception control portion 21. Furthermore, the cell input control portion 24 makes reference to a managing table 30 stored in the state storage portion 22 to perform process of forced disposal, reception accumulation and so forth of the ATM cell depending upon attribute corresponding to VCI of the input ATM cell.

Figure 2:
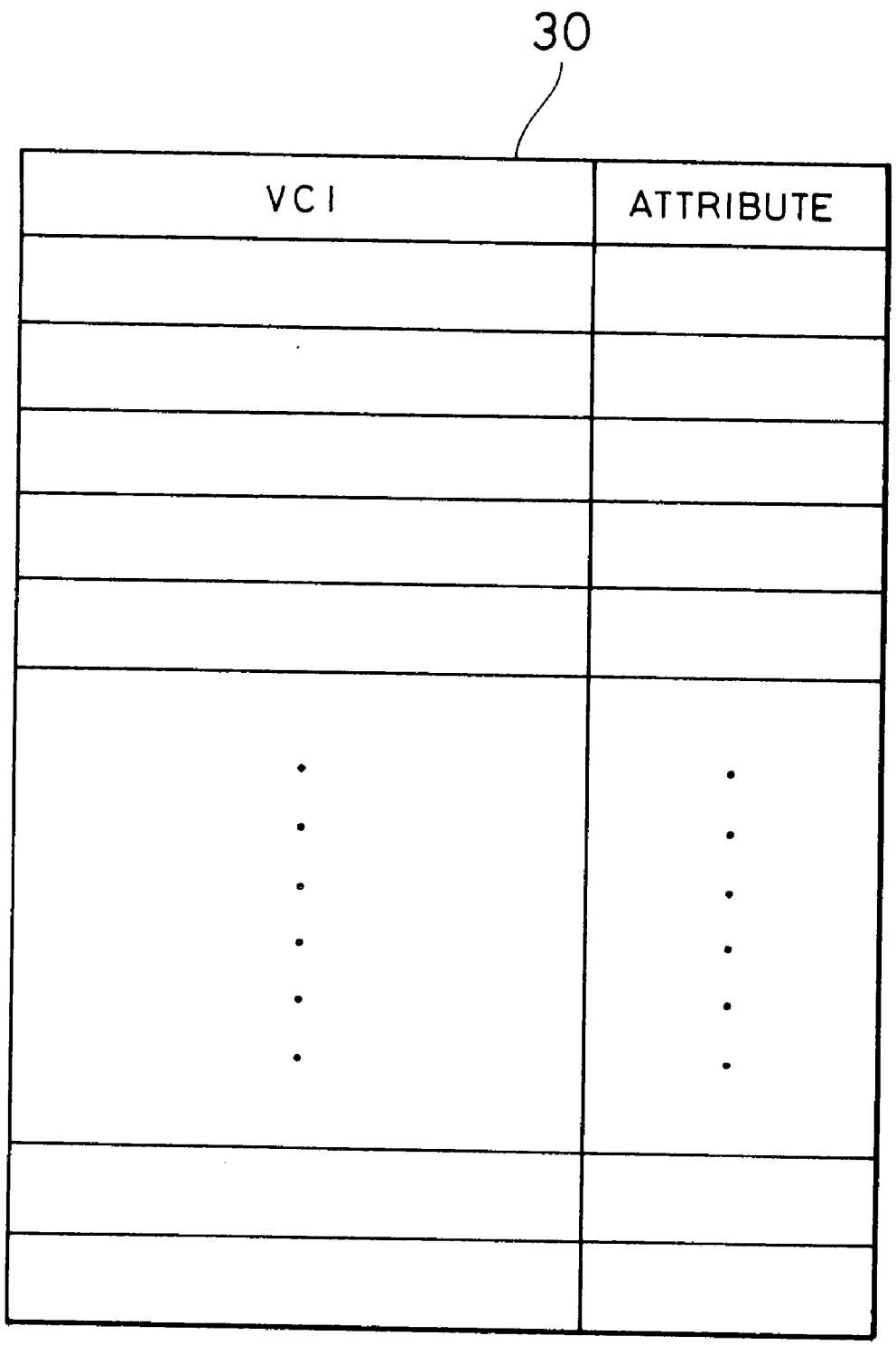
FIG. 2 is an illustration showing an example of structure of a cell disposal managing table provided in a state storage portion 22 in FIG. 1.

FIG. 2 shows an example of a structure of a cell disposal managing table 30 stored in the state storage portion 22. The cell disposal managing table 30 is provided with a storage section for registering VCI and a storage section (2 bits) indicative of attribute corresponding to registered VCI. In the attribute storage section, a state attribute of the ATM cell of the logical channel (VC), i.e. "inapplicable" (bit value "00"), "packet not received" (bit value "01"), "packet reception enable" (bit value "10", and "packet in disposal" (bit value 11) is stored.

When a new logical channel (VC) is established by signalling process, it is declared whether packet disposal process is desired or not. When the packet disposal process is desired, bit value "01" is set in a column of the corresponding logical channel (VC) in the managing table. If packet disposal process is not desired, "inapplicable" (bit value "00") is set in the column of the corresponding logical channel (VC) in the managing table.

The buffer occupied amount counting portion 23 counts a buffer occupied amount of the cell buffer 10 per the logical channel, and outputs the counted occupied amount of the logical channel corresponding to the VCI noticed from the packet reception control portion 21.

The packet reception control portion 21 receives a notice of the VCI as a cell information of the ATM cell arriving from the cell input control portion 24, generates a threshold value on the basis of the occupied amount of the overall buffer noticed from the buffer occupied amount counting portion 23 and number of logical channels in "packet reception enable" state in the managing table 30, and updates the managing table in the state storage portion 22 by comparing the calculated threshold value and the buffer occupied amount of the logical channel (VC) corresponding to the noticed VCI.

On the other hand, the cell input control portion 24 makes reference to the managing table on the basis of the logical channel identifier (VCI) with respect to all of the ATM cells arriving at the cell buffer 10 to accumulate the ATM cells when the attribute thereof is "00" (inapplicable) or "10" (packet reception enable). On the other hand, when the attribute is "11" (packet in disposal", the ATM cell is forcedly disposed (dropped).

On the other hand, the cell input control portion 24 is responsive to arrival of EOM cell indicative of the end of the AAL packet, to issue a notice to the packet reception control portion 21. The packet reception control portion 21 modifies the managing table to "01" (packet not received as long as the state of the corresponding logical channel (VC) is not "00" (inapplicable).

When the ATM cell from the logical channel (VC) in the state of "01" (packet not received), the cell input control portion 24 notifies the VCI of the received ATM cell to the packer reception control portion 21. The packet reception control portion 21 at first compares the occupied amount Q_total of the overall buffer provided from the buffer occupied amount counting portion 23 and the predetermined threshold value Qth_total to set "10" (packet reception enable) for the corresponding logical channel (VC) when the occupied amount of the overall buffer is not exceed the predetermined threshold value (Q_total≦Qth_total).

On the other hand, when the occupied amount of the over all buffer is in excess of the predetermined threshold value (Q_total>Qth_total), the threshold value Qth_vc for the corresponding logical channel (VC) is generated according to $$Qth\_vc = (Q\_total/T) \times k \quad (1)$$

on the basis of the occupied amount Q_total of the overall buffer and number T of the logical channels (VC) in the state of "10" (packet reception enable) in the managing table.

If a buffer occupying amount Q_vc of the corresponding logical channel (VC) provided from the buffer occupied amount counting portion 23 exceeds the calculated threshold value Qth_vc, "11" (packet in disposal) is set for the corresponding logical channel, and if less than or equal to the threshold value, "10" (packet reception enable) is set.

Figure 3:
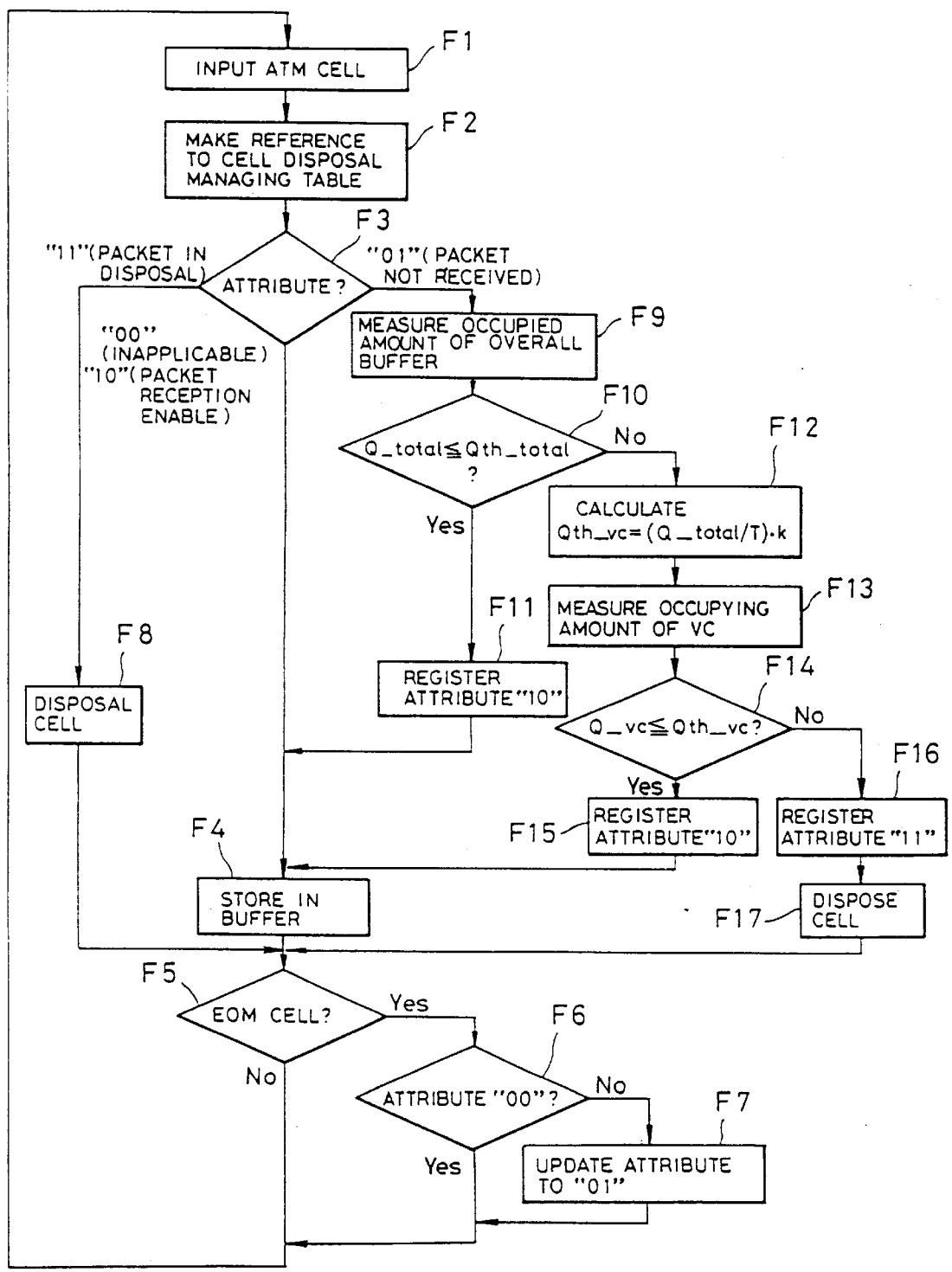
FIG. 3 is a flowchart showing operation of the shown embodiment of the ATM cell buffer managing system according to the invention.

Next, the operation of the preferred embodiment of the ATM cell buffer managing system according to the invention will be discussed with reference to the flowchart of FIG. 3. At first, when the ATM cell is input to the cell input control portion 24 (F1), the cell input control portion 24 makes reference to the cell disposal managing table 30 on the basis of the logical channel identifier (VCI) (F2) and checks the status registered in the managing table 30 (F3). If the attribute of the corresponding logical channel is "00" (inapplicable) or "10" (packet reception enable), the ATM cell is accumulated as it is (F4).

Finally, check is performed whether the arriving cell is EOM cell or not (F5). If the arriving cell is EOM cell, EOM and VCI are noticed to the packet reception control portion 21. Then, the packet reception control portion 21 set the status to "01" (packet not received) unless the status of the corresponding logical channel (VC) is "00" (inapplicable) (F7).

On the other hand, when the attribute as checked at step F3 is "11" (packet in disposal), the ATM is forcedly disposed (dropped) in the cell input control portion 24 (F8).

At step F3, when the state of the corresponding logical channel (VC) is "01" (packet not received), the ATM cell can be regarded as the leading cell of the upper layer packet. Therefore, the cell input control portion 21 notifies the VCI to the packet reception control portion 21. Then, the packet reception control portion 21 makes the buffer occupied amount counting portion 23 to measure the current occupied amount of the overall buffer (F9).

When the occupied amount Q_total of the overall buffer is less than or equal to the predetermined threshold value Qth_total (F10), judgement can be made that all of the ATM cells of the packet can be received to permit setting of the state of the corresponding logical channel (VC) to "10" (packet reception enable) (F11). If the occupied amount Q_total of the overall buffer is greater than or equal to the predetermined threshold value Qth_total (F10), the threshold value Qth_vc for the logical channel (VC) corresponding to the noticed VCI is calculated by the foregoing equation (1) on the basis of the occupied amount Q_total of the overall buffer, the number T of the logical channels (VC) in the state "10" (packet reception enable), and the predetermined constant k (F12).

If the occupied amount Q_vc of the corresponding logical channel provided from the buffer occupied amount counting portion 23 exceeds the calculated threshold value Qth_vc for the logical channel (VC), "11" (packet in disposal) is set (F16). On the other hand, when the occupied amount Q_vc of the corresponding logical channel provided from the buffer occupied amount counting portion 23 is less than or equal to the calculated threshold value Qth_vc, "10" (packet reception enable) is set for the corresponding logical channel (VC) (F15).

As set forth above, with the embodiment set forth above, by establishing the cell disposal managing table 30 which sets whether reception of the packet is possible or not per each logical channel (VC) based on the buffer occupying amount of each logical channel (VC) and the threshold value so that the ATM cells of the logical channel (VC) for which "11" (packet in disposal" is set, may be disposed in the cell input control portion 24 before inputting to the buffer. By this, possibility of forced disposal excessively for the specific logical channel can be lowered and effective throughput of the upper layer packet level of all of the logical channels (VC) can be improved uniformly.

Concrete examples will be discussed with reference to FIGS. 4A to 11B.

Figure 4A:
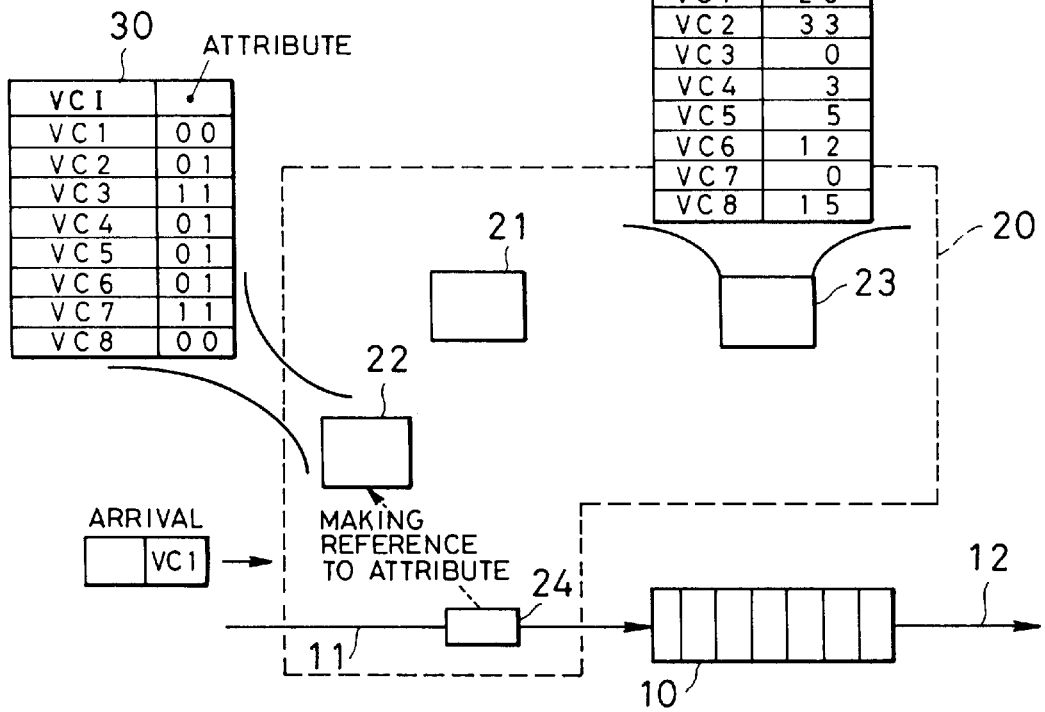
FIGS. 4A and 4B are explanatory illustration showing a process procedure upon arrival of an ATM cell of a logical channel having an attribute of "00" representative of state of "inapplicability of selective packet disposal", in the shown embodiment of the ATM cell buffer managing system according to the invention.
Figure 4B:
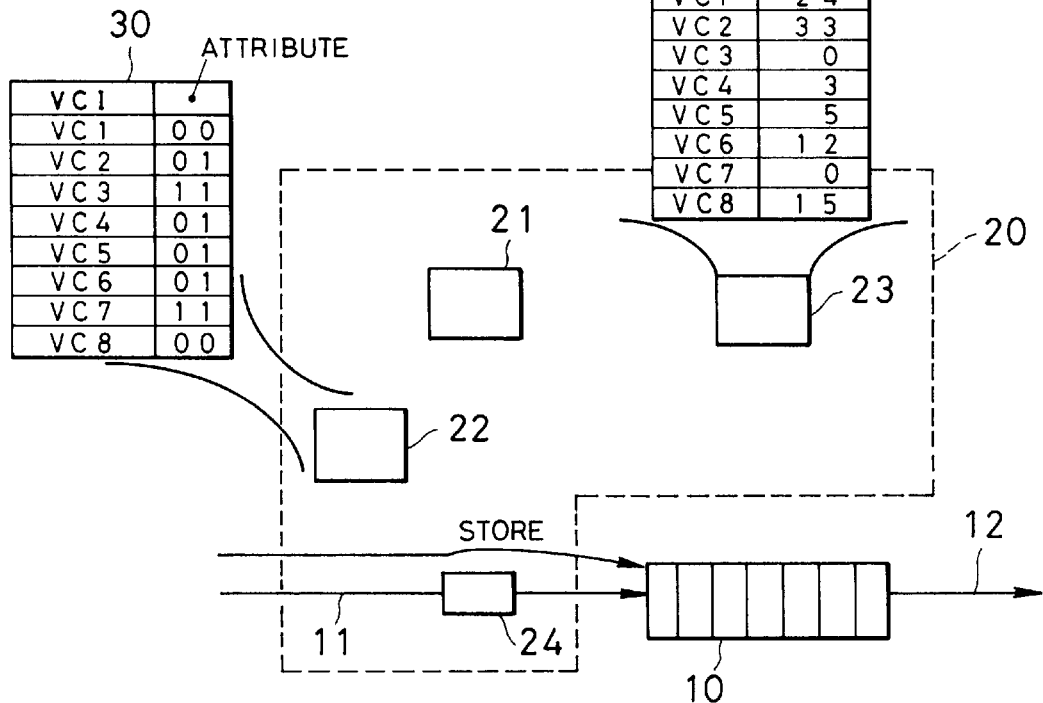

FIG. 4A shows a condition where the ATM cell of the VC1 having attribute of "00" (inapplicable) arrives at the cell input control portion 24. Since the attribute of the corresponding logical channel as set in the managing table is inapplicable, judgement can be made that selective packet disposal process is not applied for the logical channel corresponding to the arriving VCI. Thus, the cell input control portion 24 accumulates the ATM cell after reception process therein (FIG. 4B).

FIG. 5A shows a condition where the ATM cell of the VC2 having attribute of "10" (packet reception enable) arrives at the cell input control portion 24. Since the attribute of the corresponding channel is to enable reception of the packet, the received ATM cell is accumulated in the cell buffer 10 after reception process in the cell input control portion 24 (FIG. 5B).

Figure 6A:
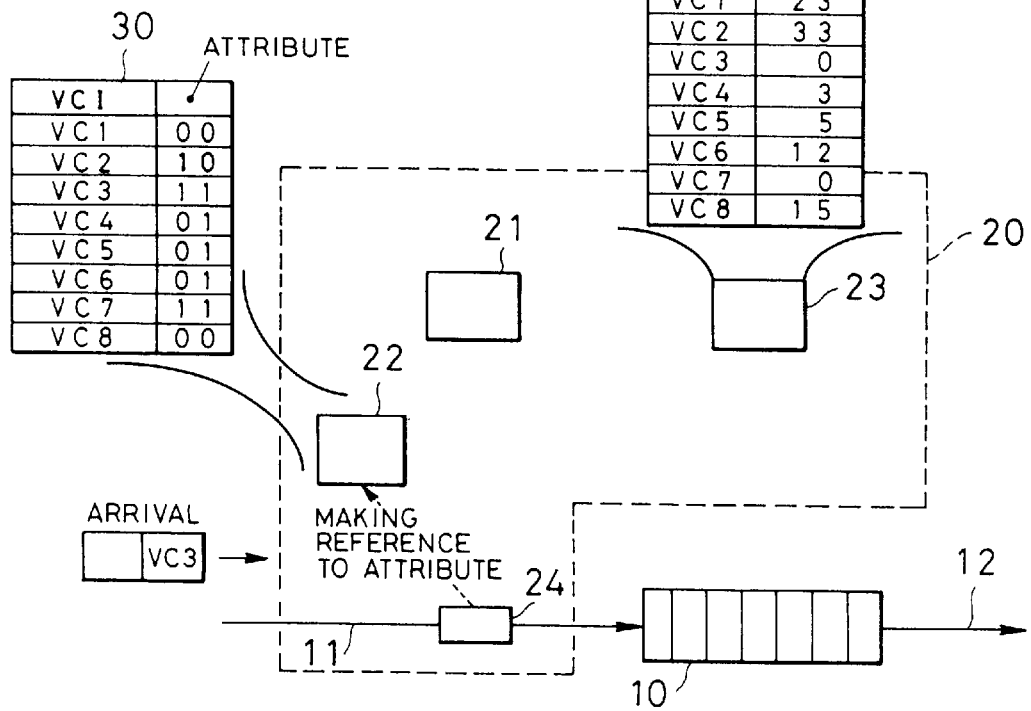
FIGS. 6A and 6B are explanatory illustration showing a process procedure upon arrival of the ATM cell of the logical channel having an attribute of "11" representative of state of "packet disposal", in the shown embodiment of the ATM cell buffer managing system according to the invention.
Figure 6B:
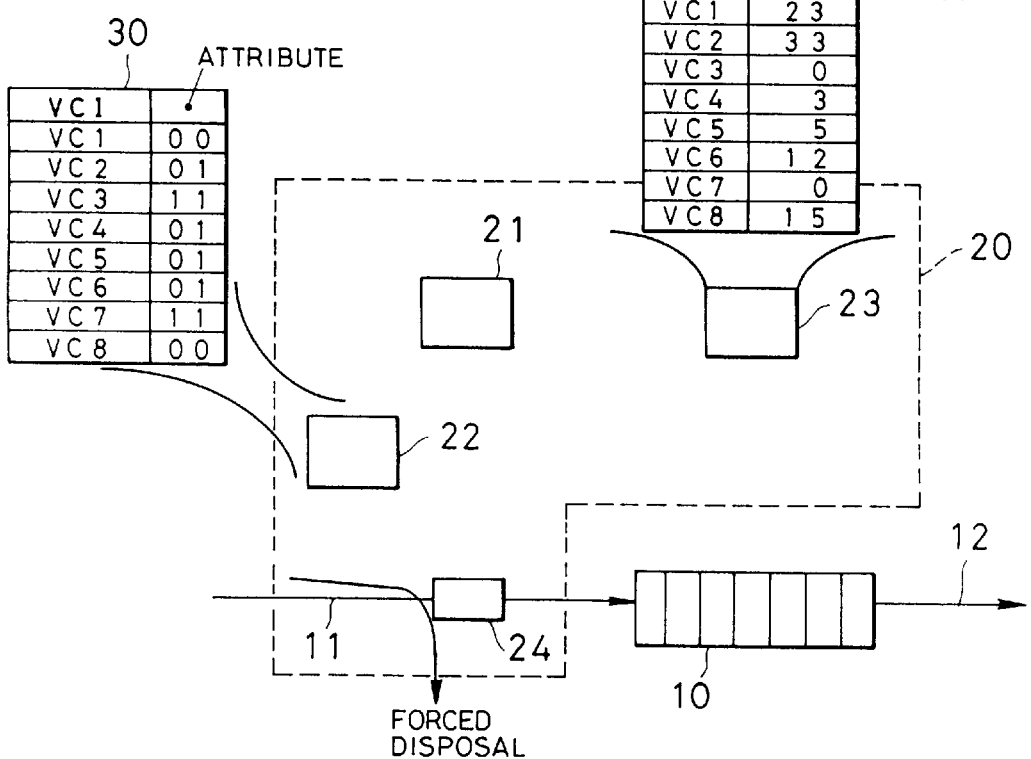

FIG. 6A shows a condition where the ATM cell of the VC3 having attribute of "11" (packet in disposal) arrives at the cell input control portion 24. The reason why the attribute is set to dispose the packet is that the buffer occupied amount is greater than or equal to the threshold value upon arrival of the leading cell. All of the ATM cells of the VC3 are null, and thus are disposed in the cell input control portion 24 (FIG. 6B).

FIGS. 7A to 9B show a condition where the ATM cell of the logical channel (VC) having the attribute of "01" (packet not received) arrives at the cell input control portion 24. In the shown embodiment, the threshold value relative to the overall capacity of the buffer is set at Qth_total=30. On the other hand, as the predetermined coefficient, k=0.5 is used. This coefficient may be dynamically set by a operator.

Figure 7A:
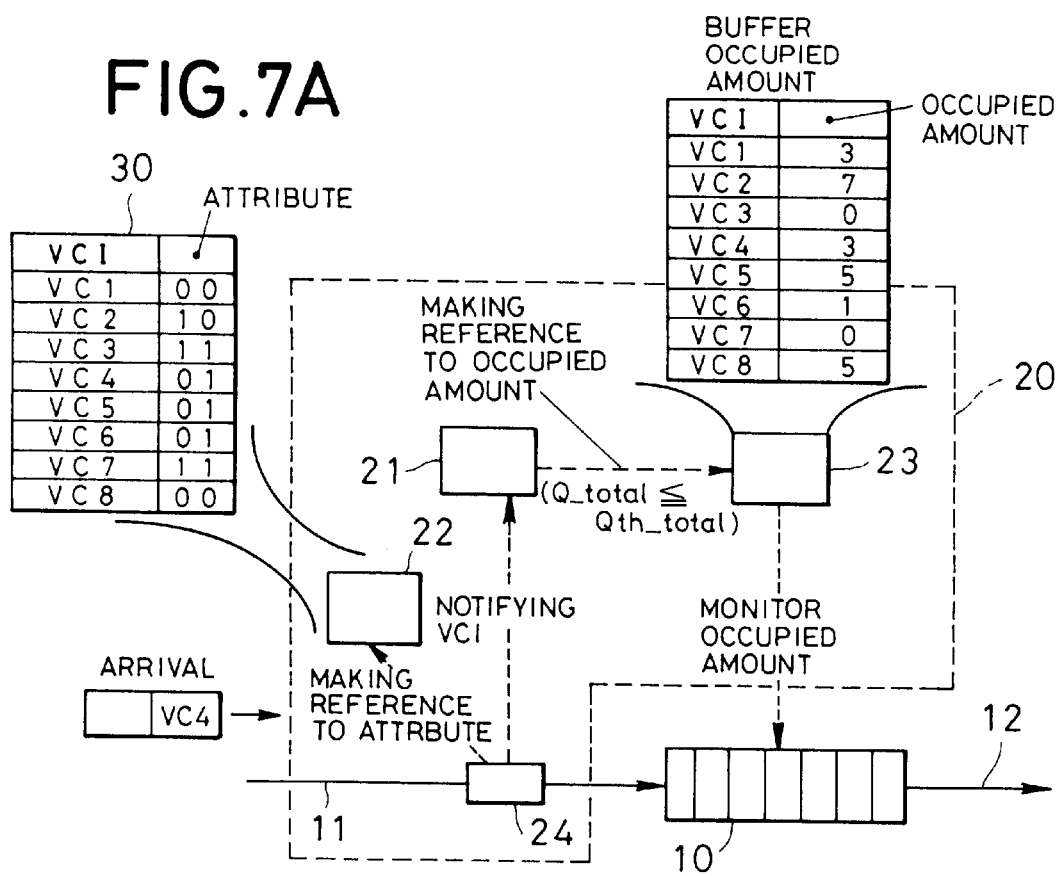
FIGS. 7A and 7B are explanatory illustration showing a process procedure upon arrival of the ATM cell of the logical channel having an attribute of "01" representative of state of "packet not received" when the overall occupied amount of a cell buffer is less than or equal to a predetermined threshold value, in the shown embodiment of the ATM cell buffer managing system according to the invention.
Figure 7B:
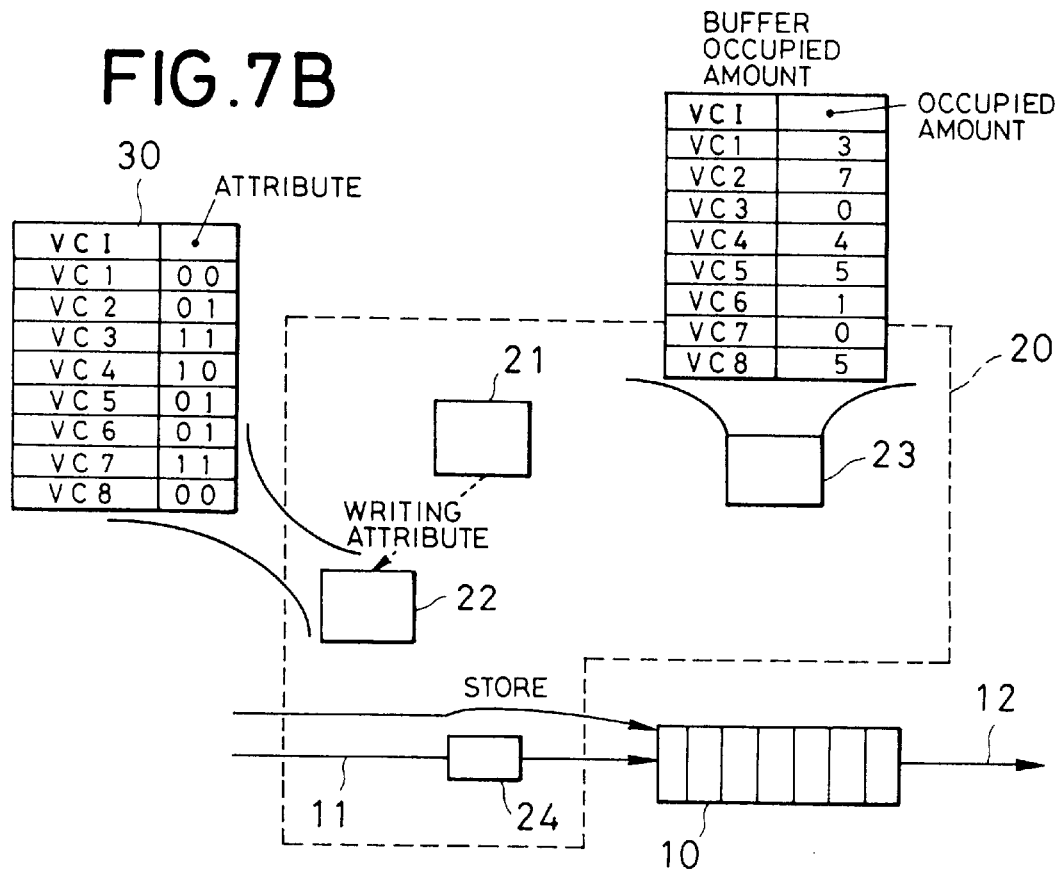

FIG. 7A shows a condition where the ATM cell of VC4 arrives at the cell input control portion 24 in the condition where the attribute is "01" (packet not received), when the occupied amount of the overall cell buffer Q_total (=24) is smaller than the threshold value (=30). Since the status registered in the managing table 30 is that the packet is not received yet, the first arrived ATM cell is judged as the leading cell of the upper layer packet. Also, a sufficient vacant capacity (Q_total≦Qth_total) is present in the cell buffer 10, it can be inferred that all of the ATM cells of the packet may be stored. In this condition (FIG. 7B), the leading cell is accumulated in the cell buffer 10.

Figure 8A:
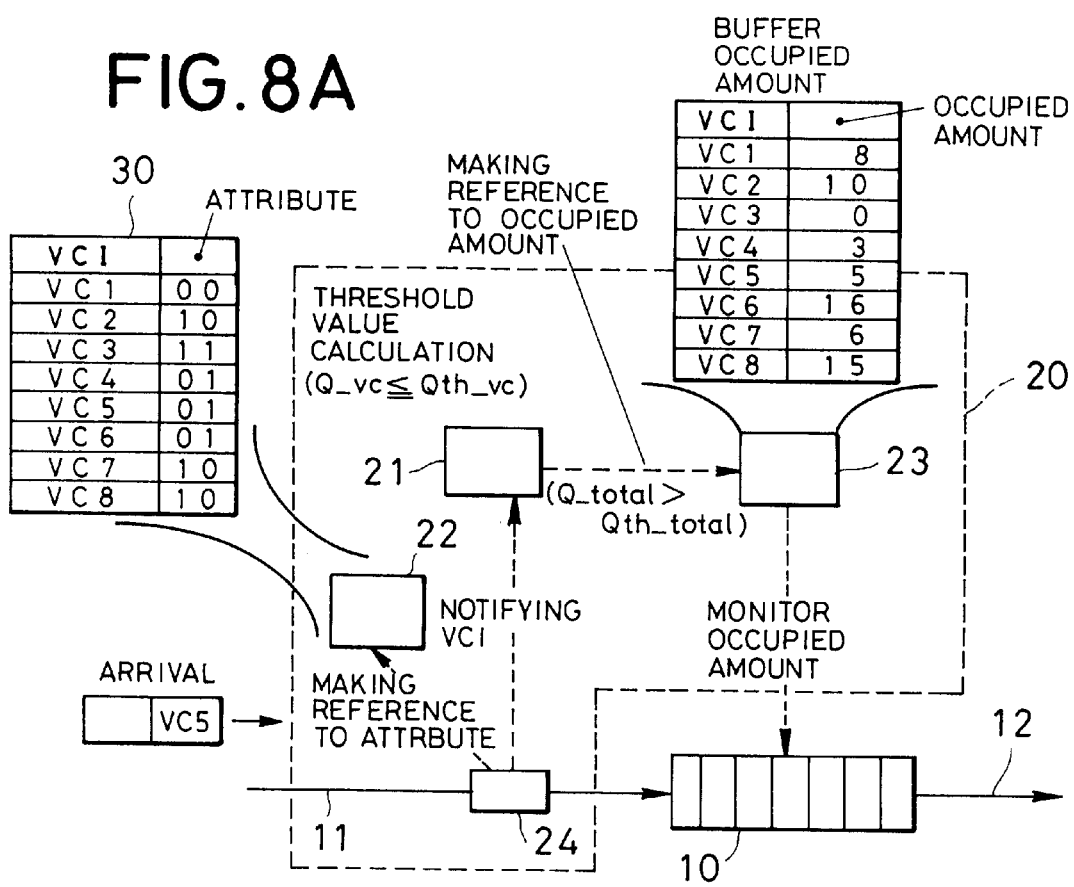
FIGS. 8A and 8B are explanatory illustration showing a process procedure upon arrival of the ATM cell of the logical channel having an attribute of "01" when the overall occupied amount of a cell buffer is in excess of the predetermined threshold value, in the shown embodiment of the ATM cell buffer managing system according to the invention.
Figure 8B:
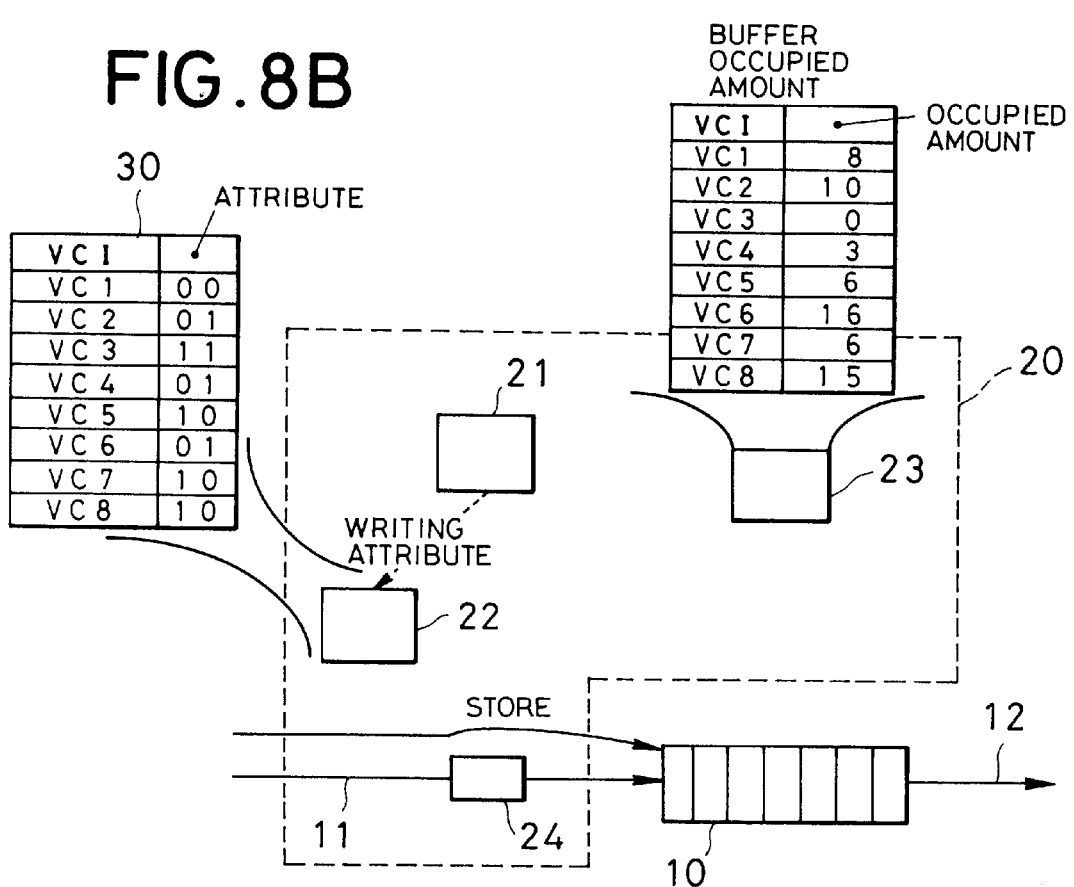

FIG. 8A shows a condition where the ATM cell of VC5 arrives at the cell input control portion 24 in the condition where the attribute is "01" (packet not received), when the occupied amount of the overall cell buffer Q_total (=63) is greater than the threshold value (=30). Since the status registered in the managing table 30 is that the packet is not received yet, the first arrived ATM cell is judged as the leading cell of the upper layer packet.

However, since the occupied amount of the overall cell buffer 10 is greater than the predetermined threshold value (Q_total>Qth_total), the threshold value Qth_vc for the logical channel (VC) is calculated on the basis of the occupied amount Q_total of the overall buffer, number T of the logical channels (VC) in the state of "10" (packet reception enable) and the predetermined coefficient k.

Since the occupied amount of the overall buffer Q_total is 63, the number T of the logical channels (VC) in the state of "10" (packet reception enable) in the managing table 30 is 3, and the predetermined coefficient k is 0.5, the threshold Qth_vc for the VC5 becomes Qth_vc =10.5 as calculated through the foregoing equation (1). On the other hand, the occupying amount Q_vc of the ATM cells of the VC5 in the cell buffer is 5 and thus is smaller than the calculated threshold valve Qth_vc (=10.5). Therefore, it can be inferred that all of the ATM cells in the packet of the VC5 may be stored in the cell buffer. Therefore, in the next state (FIG. 8B), "10" (packet reception enable) is set in the managing table 30 corresponding to the VC5. Then, the leading ATM cell is stored in the cell buffer 10.

Figure 9A:
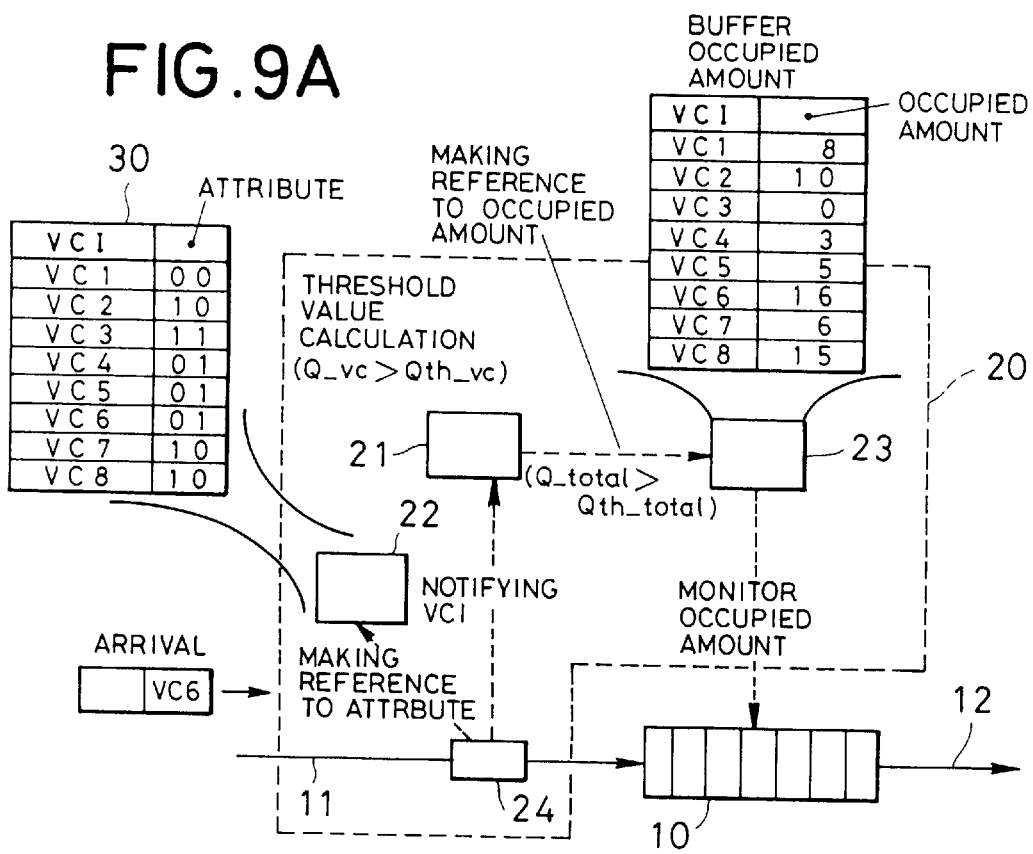
FIGS. 9A and 9B are explanatory illustration showing a process procedure upon arrival of the ATM cell of the logical channel having an attribute of "01" when the overall occupied amount of a cell buffer is in excess of the predetermined threshold value, in the shown embodiment of the ATM cell buffer managing system according to the invention.

FIG. 9A shows a condition where the ATM cell of VC6 arrives at the cell input control portion 24 in the condition where the attribute is "01" (packet not received), when the occupied amount of the overall cell buffer Q_total (=63) is greater than the threshold value (=30). Since the status registered in the managing table 30 is that the packet is not received yet, the first arrived ATM cell is judged as the leading cell of the upper layer packet.

However, since the occupied amount of the overall cell buffer 10 is greater than the predetermined threshold value (Q_total>Qth_total), the threshold valve Qth_vc for the logical channel (VC) is calculated on the basis of the occupied amount Q_total of the overall buffer, number T of the logical channels (VC) in the state of "10" (packet reception enable) and the predetermined coefficient k.

Figure 9B:
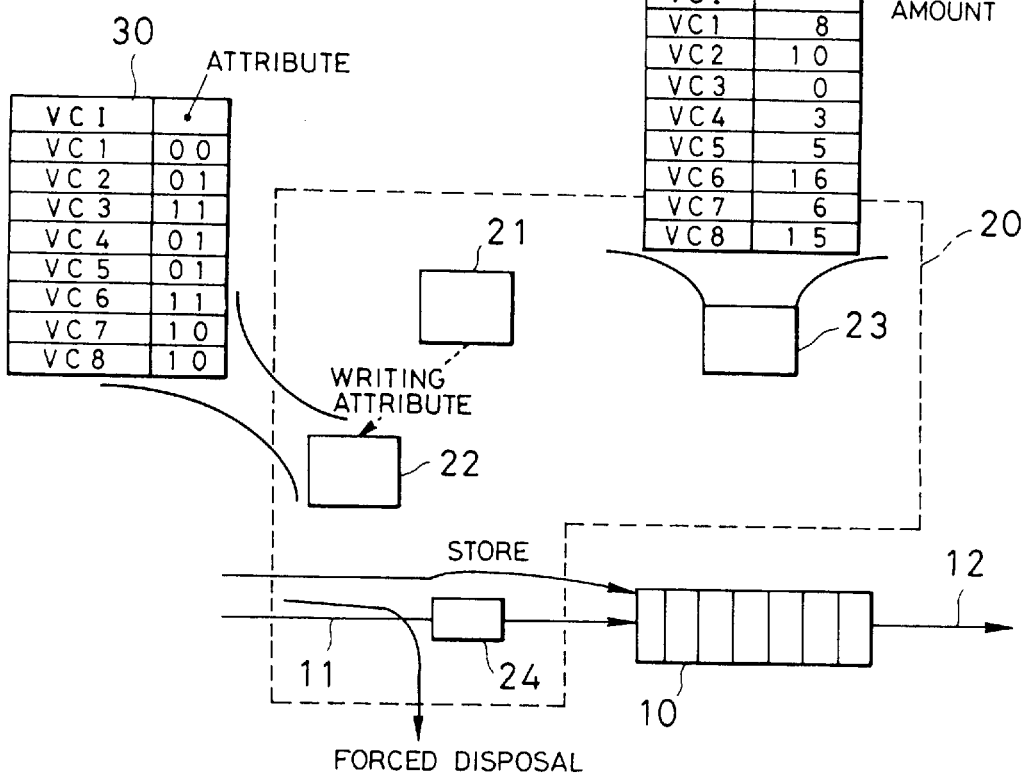

Since the occupied amount of the overall buffer Q_total is 63, the number T of the logical channels (VC) in the state of "10" (packet reception enable) in the managing table 30 is 3, and the predetermined coefficient k is 0.5, the threshold Qth_total for the VC6 becomes Qth_vc=10.5 as calculated through the foregoing equation (1). On the other hand, the occupying amount Q_vc of the ATM cells of the VC6 in the cell buffer is 16 and thus is greater than the calculated threshold value Qth_vc (=10.5). Therefore, it can be judged that the packet of the upper layer having the leading cell in question may cause overflow from the buffer to cause loss of several amount of cells. Then, "11" (packet in disposal) is set in the managing table 30 to dispose the leading cell in the cell input control portion 24 (FIG. 9B). All of the ATM cells of the VC6 are disposed (dropped) in the cell input control portion 24.

Figure 10A:
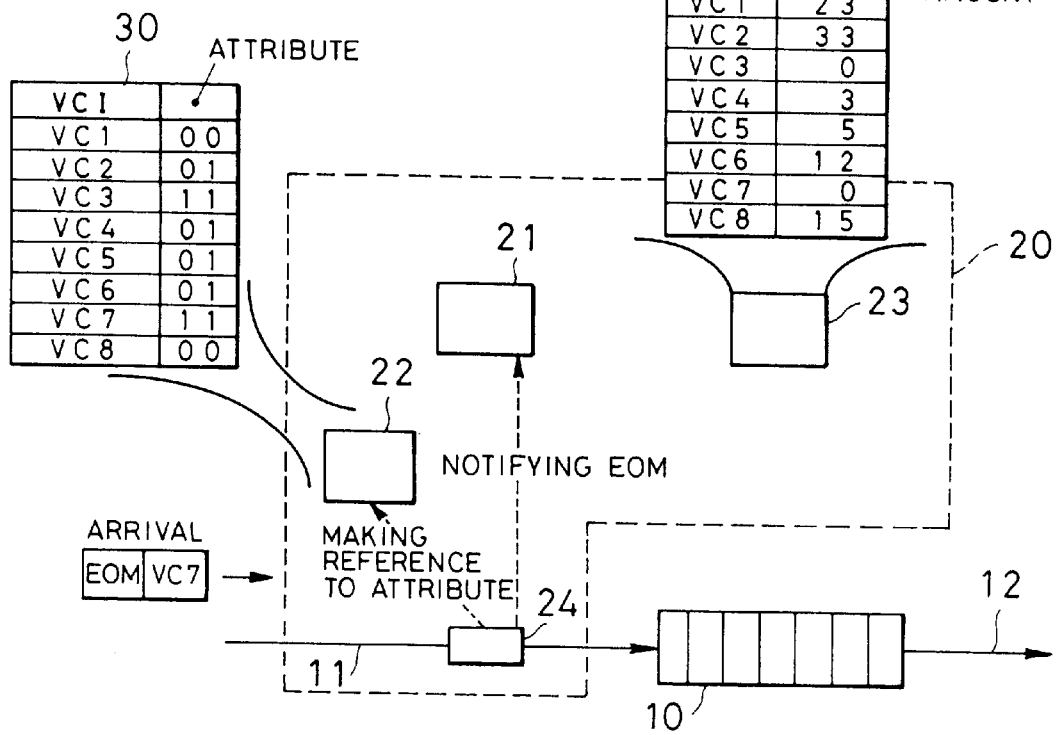
FIGS. 10A and 10B are explanatory illustration showing a process procedure upon arrival of EOM cell of the logical channel having an attribute of "11", in the shown embodiment of the ATM cell buffer managing system according to the invention.
Figure 10B:
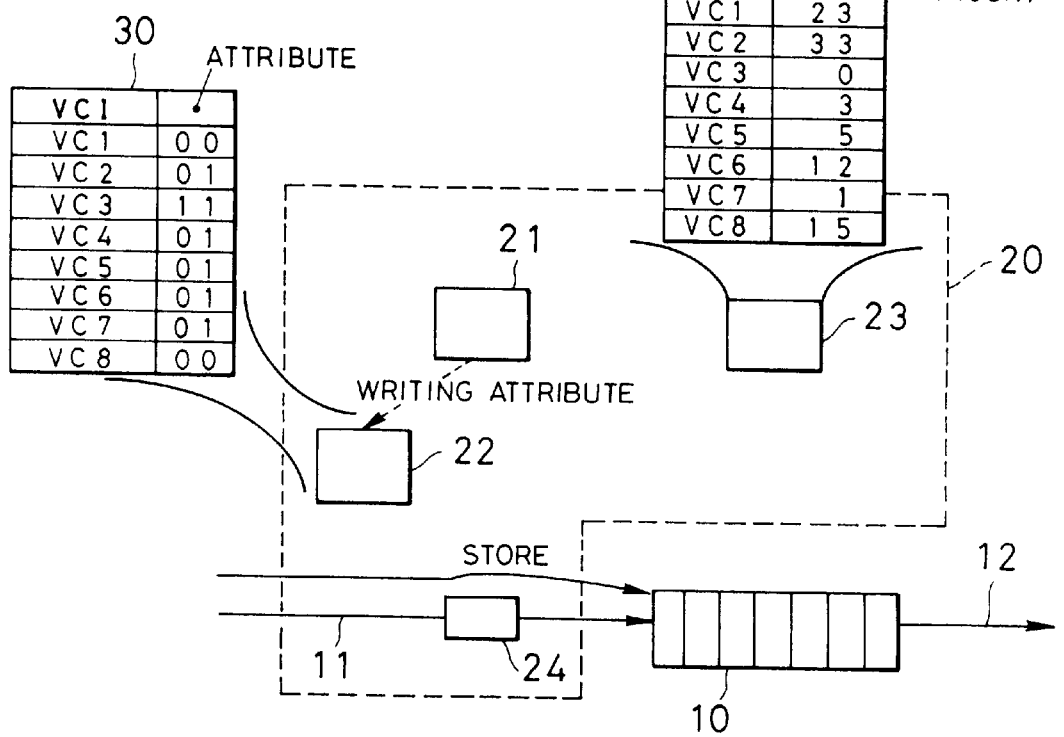

FIG. 10A shows the condition where the EOM cell of the VC7 in the state of "11" (packet in disposal) arrives. Since the attribute of the corresponding logical channel (VC7) is set for disposal, it can be appreciated that all of the ATM cells of the current VC7 arrived before the currently arriving EOM cell, are to be disposed in the cell input control portion 24. Arrival of the EOM cell represents reaching of all of the cells in the VC7, and subsequently arriving ATM cell of the VC7 is the leading cell of another upper layer packet. Therefore, the state in the managing table is re-set to "01" (packet not received) (FIG. 10B) for getting ready for cell disposal control depending upon the buffer occupied amount to be executed at the next occurrence of arrival of the ATM cell (leading cell) of the VC7.

Figure 11A:
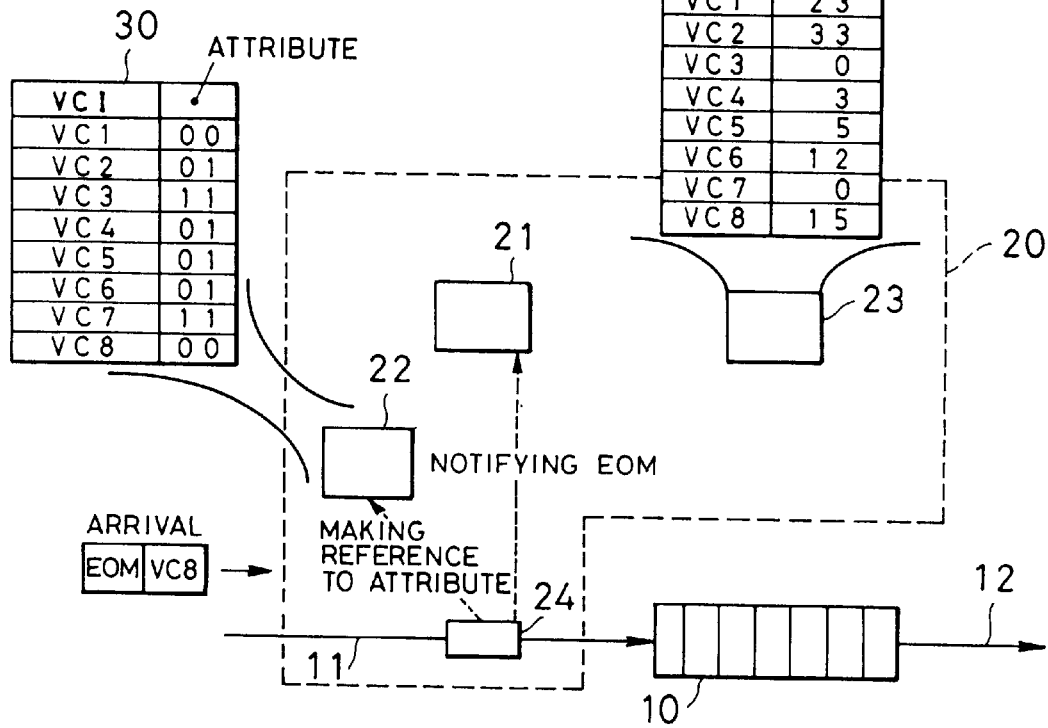
FIGS. 11A and 11B are explanatory illustration showing a process procedure upon arrival of EOM cell of the logical channel having an attribute of "00", in the shown embodiment of the ATM cell buffer managing system according to the invention.
Figure 11B:
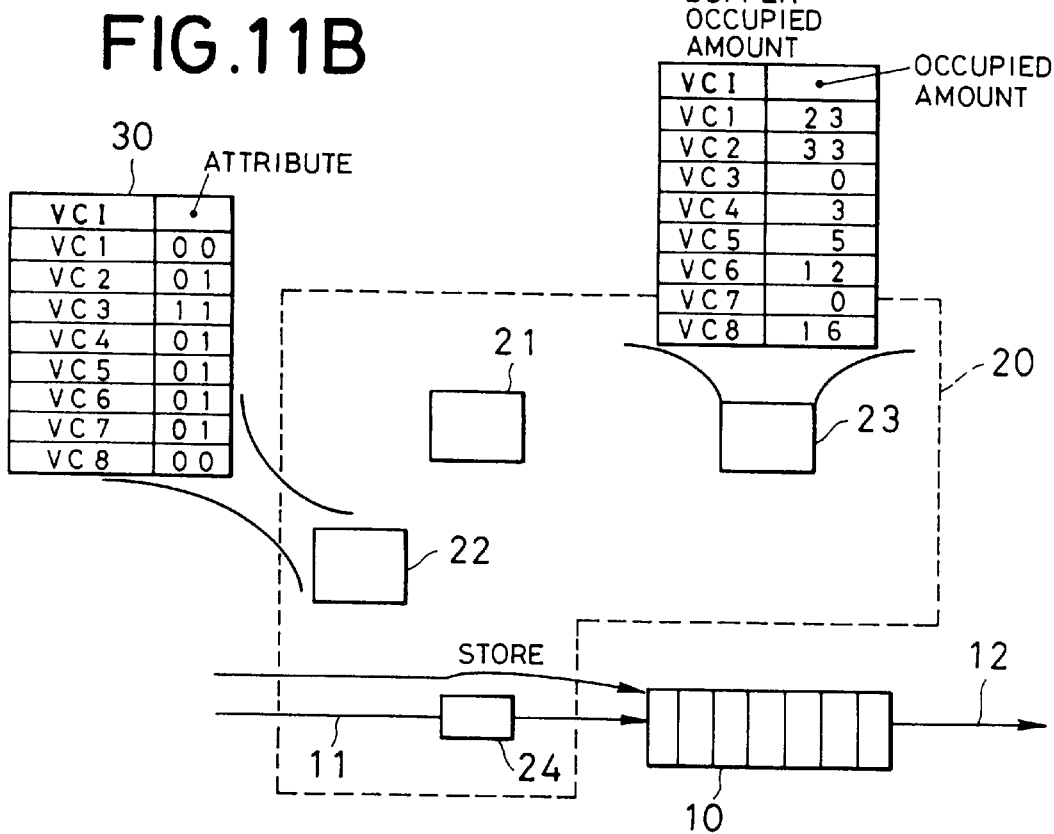

FIG. 11A shows a state where the EOM cell of the VC8 having attribute of "00" (inapplicable) arrives at the cell input control portion 24. Since the attribute is not applicable of the selective packet disposal, thus judgement is made that the selective packet disposal should not be applied to maintain the attribute as is (FIG. 11B).

As set forth above, in the buffer memory for temporarily storing the ATM cell, under the environment where logical channels (VC) having mutually distinct or different communication demands are present in admixing fashion, applying and not applying the selective packet disposal can be easily selected to permit flexible network design. Also, under the environment where the logical channels (VC) having different traffic characteristics are present in admixing fashion, deviation per logical channels (VC) of forced packet disposal can be improved.

In the shown embodiment discussed above, since the value derived by dividing the occupied amount of the overall buffer with the number of the logical channels (VC) is used as the threshold value for judgement whether reception of the ATM cells in the packets is permitted or not, the threshold value to be derived through this calculation becomes relatively large while the buffer is quite crowed, to make it difficult to perform selective packet disposal.

Figure 12:
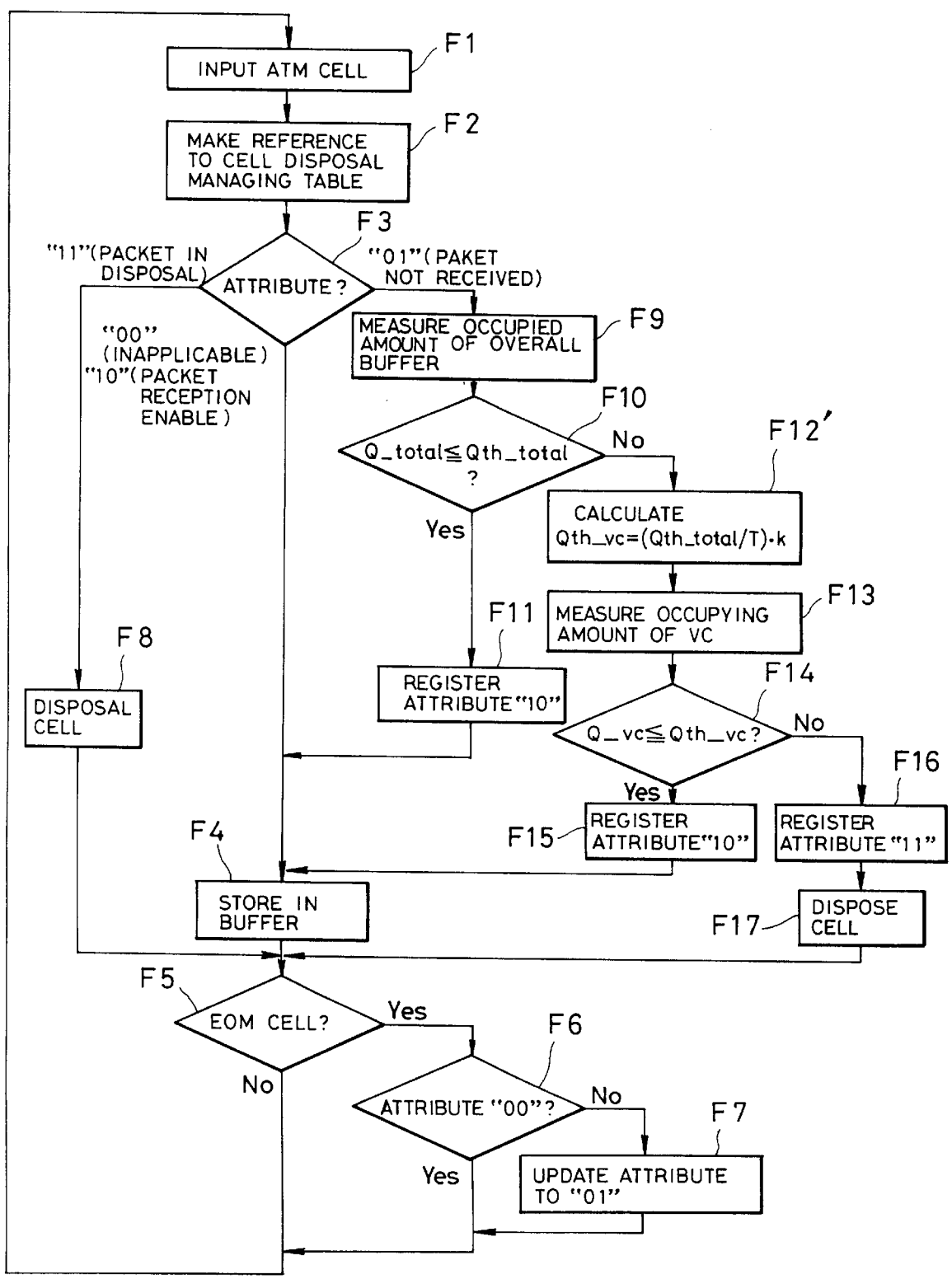
FIG. 12 is a flowchart showing operation of another embodiment of the ATM cell managing system according to the present invention.

In view of this, the second embodiment of the AMT cell buffer managing system according to the present invention will be discussed with reference to the block diagram of the system in FIG. 1 and a flowchart of FIG. 12.

In FIG. 1, when the ATM cell arrives from the logical channel (VC) in the state of "01" (packet not received), at first, the packet reception control portion 21 compares the occupied amount Q_total of the overall cell buffer and the predetermined threshold value Qth_total. If the occupied amount of the overall buffer does not exceed the threshold value (Q_total≦Qth_total), the "10" (packet reception enable) is set for the corresponding logical channel (VC).

On the other hand, if the occupied amount Q_total of the overall cell buffer is in excess of the threshold value Qth_total (Q_total>Qth_total), the threshold value Qth_vc for the corresponding logical channel (VC) is calculated on the basis of the threshold value Qth_total set for the overall buffer, the number T1 of the logical channels (VC) in the state of "10" (packet reception enable) or the number T2 of the logical channels (VC) having the cells actually stored in the buffer and the predetermined coefficient k according to the following equations:

$$\text{Qth\_vc}=(\text{Qth\_total}/T1)\times k \qquad (2)$$

$$\text{Qth\_vc}=(\text{Qth\_total}/T2)\times k \qquad (3)$$

If the buffer occupying amount Q_vc of the logical channel (VC) provided from the buffer occupied amount counting portion 23 exceeds the threshold value Qth_vc, "11" (packet in disposal) is set in the managing table. Conversely, if the buffer occupying amount Q_vc of the logical channel (VC) provided from the buffer occupied amount counting portion 23 does not exceed the threshold value Qth_vc, "10" (packet reception enable) is set for the logical channel (VC) in question in the managing table 30.

Next, the operation of the second embodiment of the ATM cell buffer managing system according to the invention will be discussed with reference to the flowchart of FIG. 12. It should be noted that, in FIG. 12, the like steps to those of the flowchart in FIG. 3 will be identified by like reference numerals.

At first, when the ATM cell is input to the cell input control portion 24 (F1), the cell input control portion 24 makes reference to the cell disposal managing table 30 on the basis of the logical channel identifier (VCI) (F2) and checks the status registered in the managing table 30 (F3). If the attribute of the corresponding logical channel is "00" (inapplicable) or "10" (packet reception enable), the ATM cell is accumulated as it is (F4). Finally, check is performed whether the arriving cell is EOM cell or not (F5). If the arriving cell is EOM cell, EOM and VCI are noticed to the packet reception control portion 21. Then, the packet reception control portion 21 set the status to "01" (packet not received) unless the status of the corresponding logical channel (VC) is "00" (inapplicable) (F7).

On the other hand, when the attribute as checked at step F3 is "11" (packet in disposal), the ATM is forcedly disposed (dropped) in the cell input control portion 24 (F8).

At step F3, when the state of the corresponding logical channel (VC) is "01" (packet not received), the ATM cell can be regarded as the leading cell of the upper layer packet. Then, the packet reception control portion 21 makes the buffer occupied amount counting portion 23 to measure the current occupied amount of the overall buffer (F9). When the occupied amount Q_total of the overall buffer is less than or equal to the predetermined threshold value Qth_total (F10), judgement can be made that all of the ATM cells of the packet can be received to permit setting of the state of the corresponding logical channel (VC) to "10" (packet reception enable) (F11).

If the occupied amount Q_total of the overall buffer is greater than the predetermined threshold value Qth_total (F10), the threshold value Qth_vc for the logical channel (VC) corresponding to the noticed VCI is calculated by the foregoing equation (2) or (3) on the basis of the occupied amount Q_total of the overall buffer, the number T1 of the logical channels (VC) in the state "10" (packet reception enable) or the number T2 of the logical channels (VC) having cells actually stored in the cell buffer, and the predetermined constant k (F12).

If the occupied amount Q_vc of the corresponding logical channel provided from the buffer occupied amount counting portion 23 exceeds the calculated threshold value Qth_vc for the logical channel (VC), "11" (packet in disposal) is set (F16). On the other hand, when the occupied amount Q_vc of the corresponding logical channel provided from the buffer occupied amount counting portion 23 is less than or equal to the calculated threshold value Qth_vc, "10" (packet reception enable) is set for the corresponding logical channel (VC) (F15).

As set forth above, with the embodiment set forth above, by establishing the cell disposal managing table 30 which sets whether reception of the packet is possible or not per each logical channel (VC) based on the buffer occupying amount of each logical channel (VC) and the threshold value derived by multiplying the number of the logical channels (VC) in the state "10" (packet reception enable) or the number of the logical channels (VC) having cells actually stored in the cell buffer by the predetermined coefficient. For the logical channel having the attribute of "11" (packet in disposal) in the managing table, the ATM cells are disposed in the cell input control portion 24 before inputting to the buffer. By this, it can be avoided the threshold value becoming excessively large in the crowded condition of the buffer. Therefore, selective packet disposal can be performed at uniform condition at any buffer condition.

Next, concrete example will be discussed with reference to FIGS. 13A to 15B.

FIGS. 13A to 15B show the condition where the ATM cell of the logical channel (VC) having attribute of "01" (packet not received) arrives at the cell input control portion 24. In the shown embodiment, the threshold value Qth_total for the overall buffer is set at 30. On the other hand, the predetermined coefficient k is set at 0.5 in the shown case. The coefficient can be dynamically set by a operator.

Figure 13A:
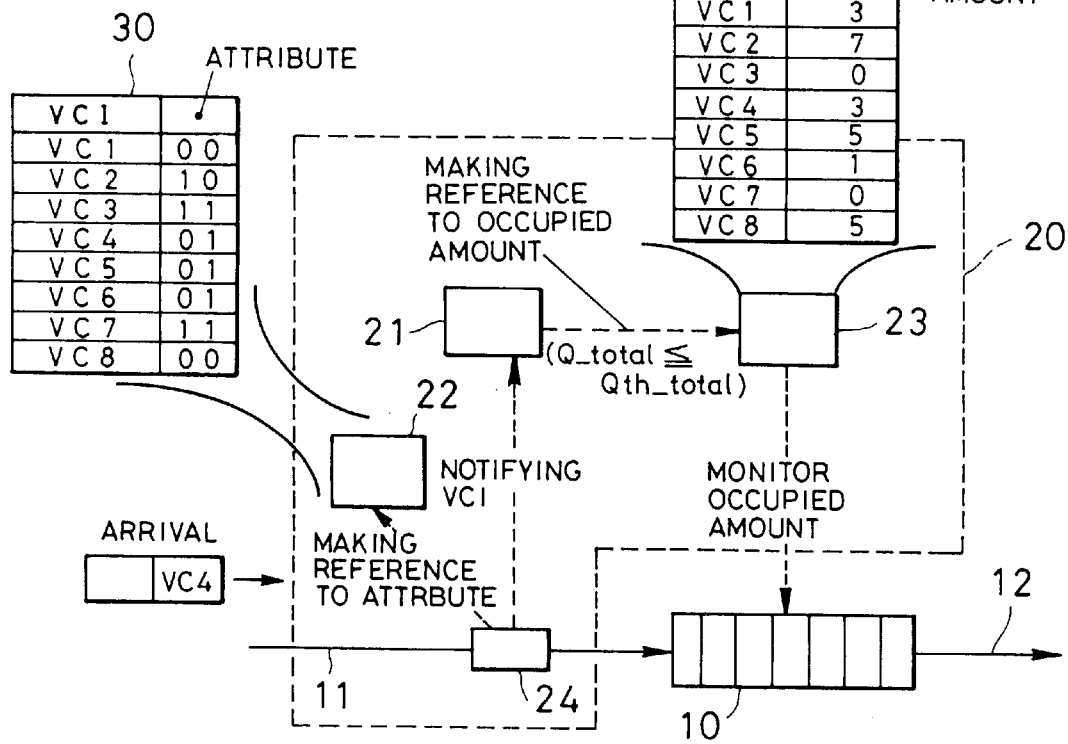
FIGS. 13A and 13B are explanatory illustration showing a process procedure upon arrival of the ATM cell of the logical channel having an attribute of "01" when the overall occupied amount of a cell buffer is in excess of the predetermined threshold value, in the shown embodiment of the ATM cell buffer managing system according to the invention.
Figure 13B:
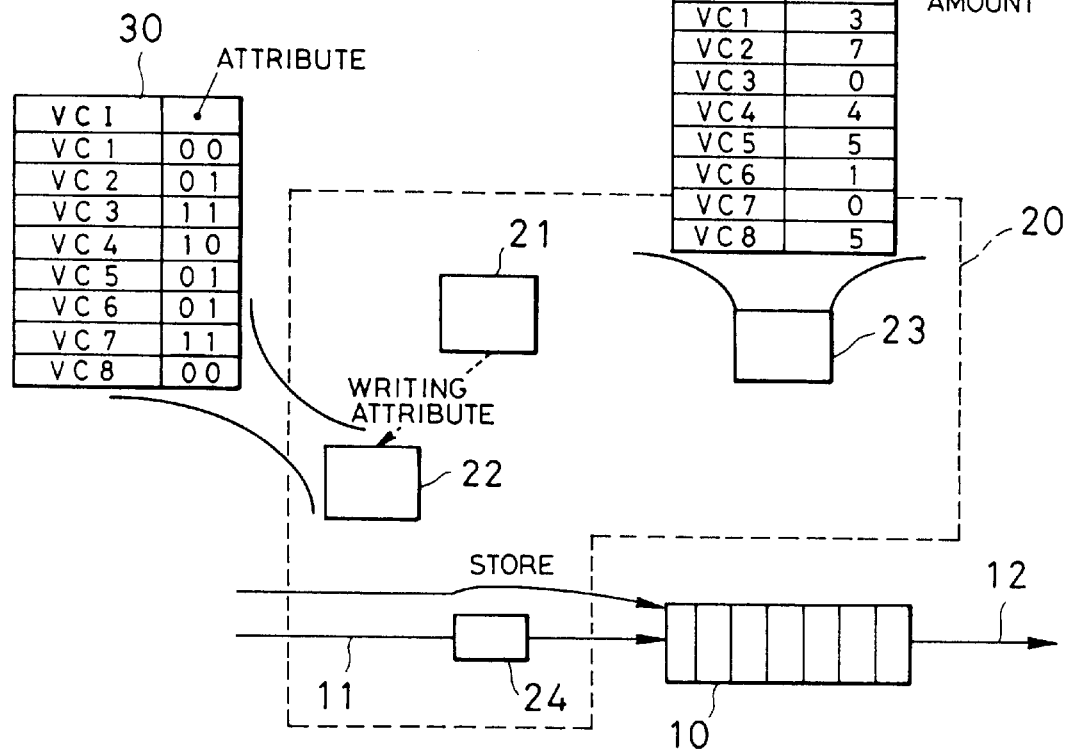

FIG. 13A shows a condition where the ATM cell of VC4 arrives at the cell input control portion 24 in the condition where the attribute is "01" (packet not received), when the occupied amount of the overall cell buffer Q_total (=24) is smaller than the threshold value (=30). Since the status registered in the managing table 30 is that the packet is not received yet, the first arrived ATM cell is judged as the leading cell of the upper layer packet. Also, a sufficient vacant capacity (Q_total≦Qth_total) is present in the cell buffer 10, it can be inferred that all of the ATM cells of the packet may be stored. In this condition (FIG. 13B), the leading cell is accumulated in the cell buffer 10.

Figure 14A:
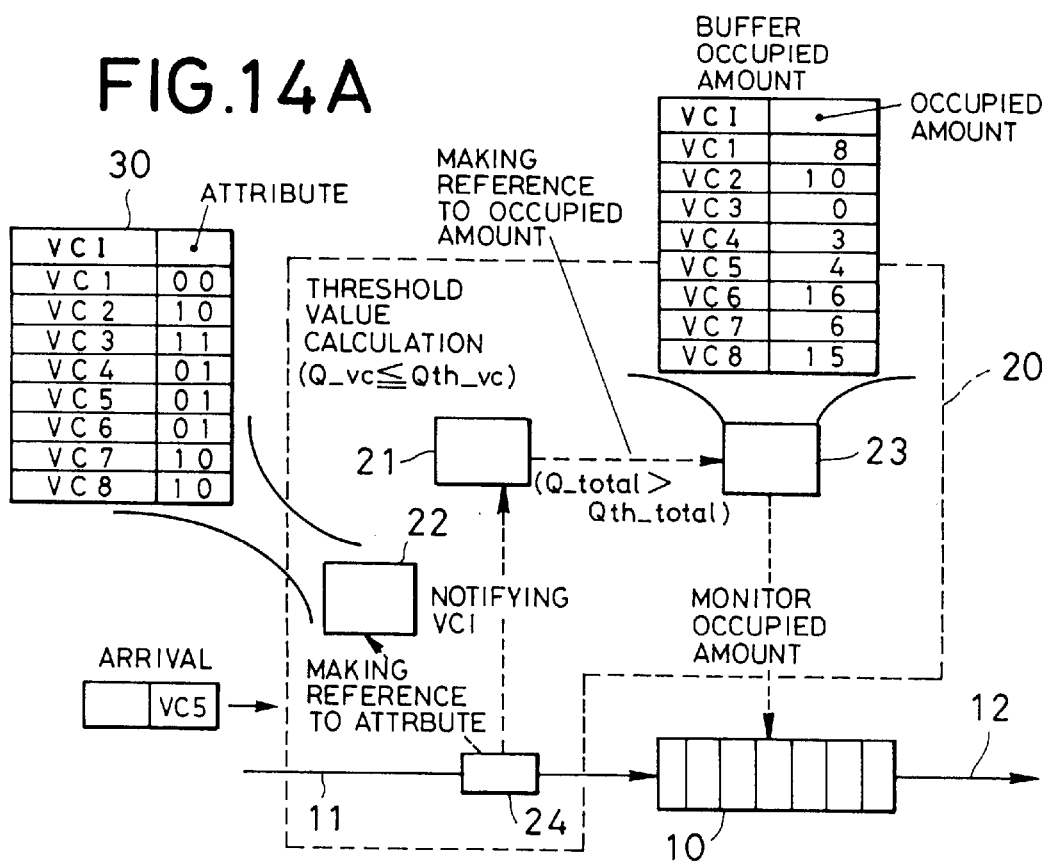
FIGS. 14A and 14B are explanatory illustration showing a process procedure upon arrival of the ATM cell of the logical channel having an attribute of "01" when the overall occupied amount of a cell buffer is in excess of the predetermined threshold value, in the shown embodiment of the ATM cell buffer managing system according to the invention.
Figure 14B:
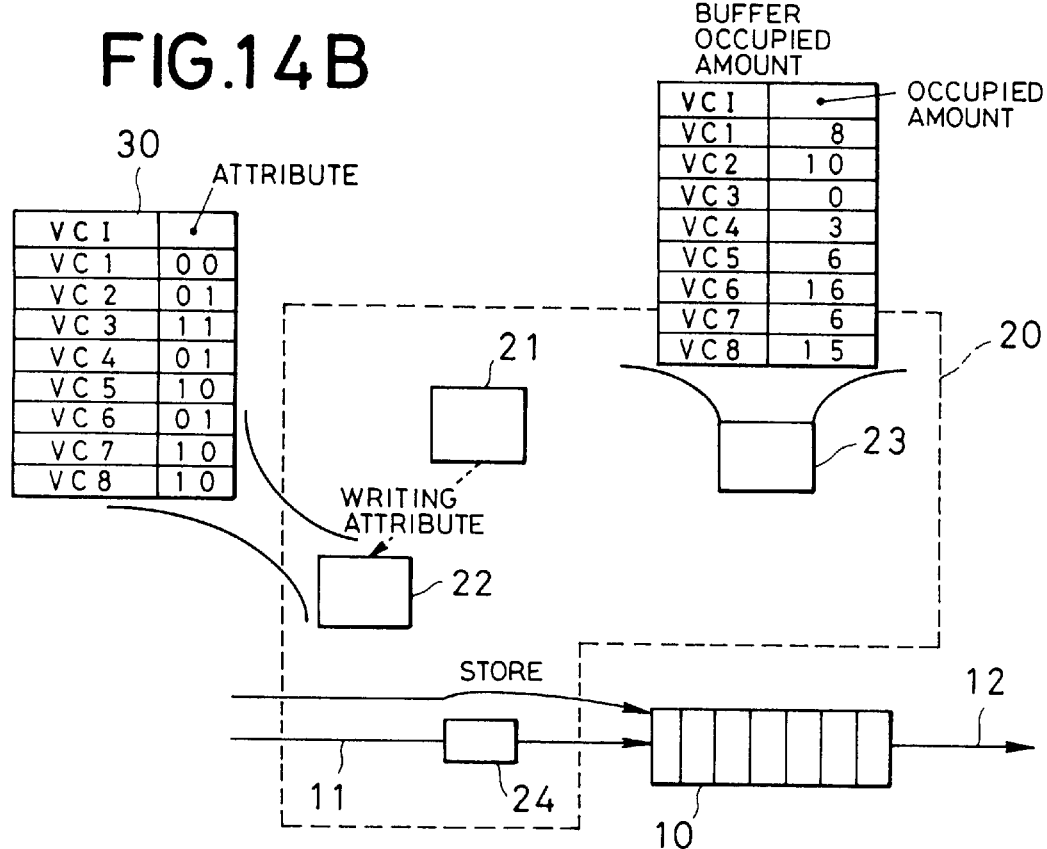

FIG. 14A shows a condition where the ATM cell of VC5 arrives at the cell input control portion 24 in the condition where the attribute is "01" (packet not received), when the occupied amount of the overall cell buffer Q_total (=62) is greater than the threshold value (=30). Since the status registered in the managing table 30 is that the packet is not received yet, the first arrived ATM cell is judged as the leading cell of the upper layer packet.

However, since the occupied amount of the overall cell buffer 10 is greater than the predetermined threshold value (Q_total>Qth_total), the threshold value Qth_vc for the logical channel (VC) is calculated on the basis of the occupied amount Q_total of the overall buffer, number T1 of the logical channels (VC) in the state of "10" (packet reception enable) and the predetermined coefficient k.

Since the threshold value Qth_total set for overall buffer is 30, the number T1 of the logical channels (VC) in the state of "10" (packet reception enable) in the managing table 30 is 3, and the predetermined coefficient k is 0.5, the threshold Qth_vc for the VC5 becomes Qth_vc=5 as calculated through the foregoing equation (2). On the other hand, the occupying amount Q_vc of the ATM cells of the VC5 in the cell buffer is 4 and thus is smaller than the calculated threshold value Qth_vc (=5). Therefore, it can be inferred that all of the ATM cells in the packet of the VC5 may be stored in the cell buffer. Therefore, in the next state (FIG. 14B), "10" (packet reception enable) is set in the managing table 30 corresponding to the VC5. Then, the leading ATM cell is stored in the cell buffer 10.

Figure 15A:
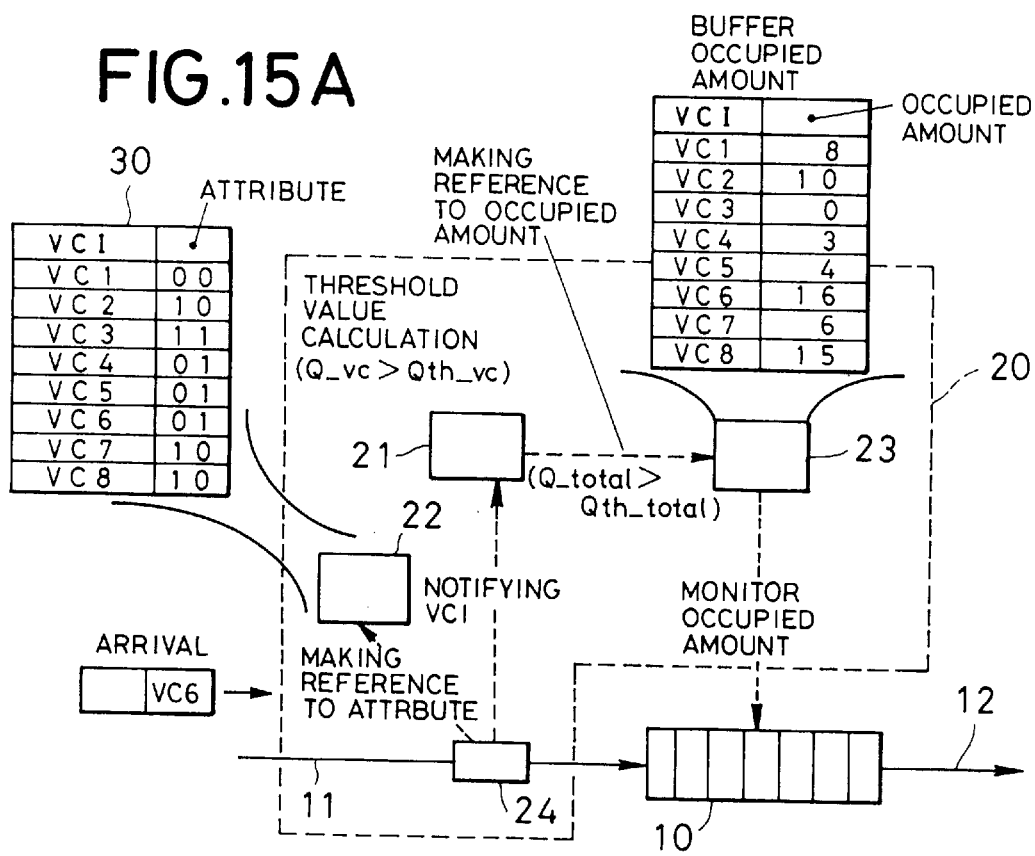
FIGS. 15A and 15B are explanatory illustration showing a process procedure upon arrival of the ATM cell of the logical channel having an attribute of "01" when the overall occupied amount of a cell buffer is in excess of the predetermined threshold value, in the shown embodiment of the ATM cell buffer managing system according to the invention.

FIG. 15A shows a condition where the ATM cell of VC6 arrives at the cell input control portion 24 in the condition where the attribute is "01" (packet not received), when the occupied amount of the overall cell buffer Q_total (=62) is greater than the threshold value (=30). Since the status registered in the managing table 30 is that the packet is not received yet, the first arrived ATM cell is judged as the leading cell of the upper layer packet.

However, since the occupied amount of the overall cell buffer 10 is greater than the predetermined threshold value (Q_total>Qth_total), the threshold value Qth_vc for the logical channel (VC) is calculated on the basis of the occupied amount Q_total of the overall buffer, number T of the logical channels (VC) in the state of "10" (packet reception enable) and the predetermined coefficient k.

Figure 15B:
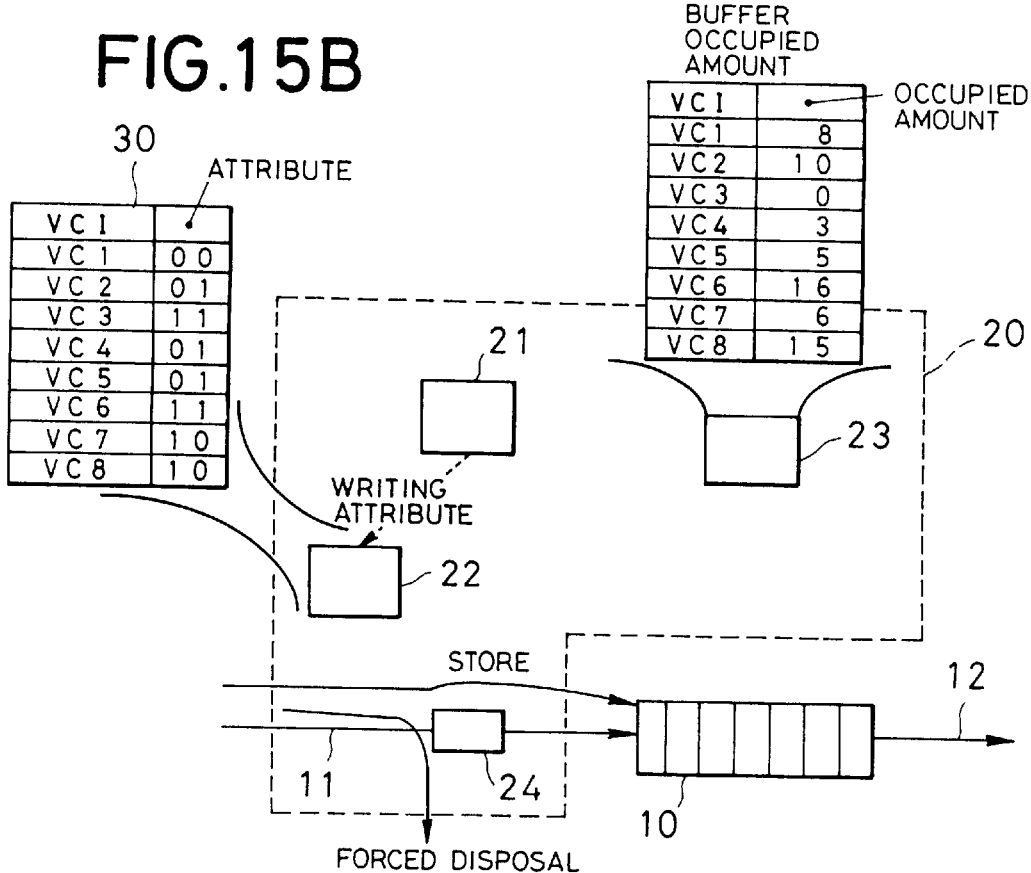
Figure 16:
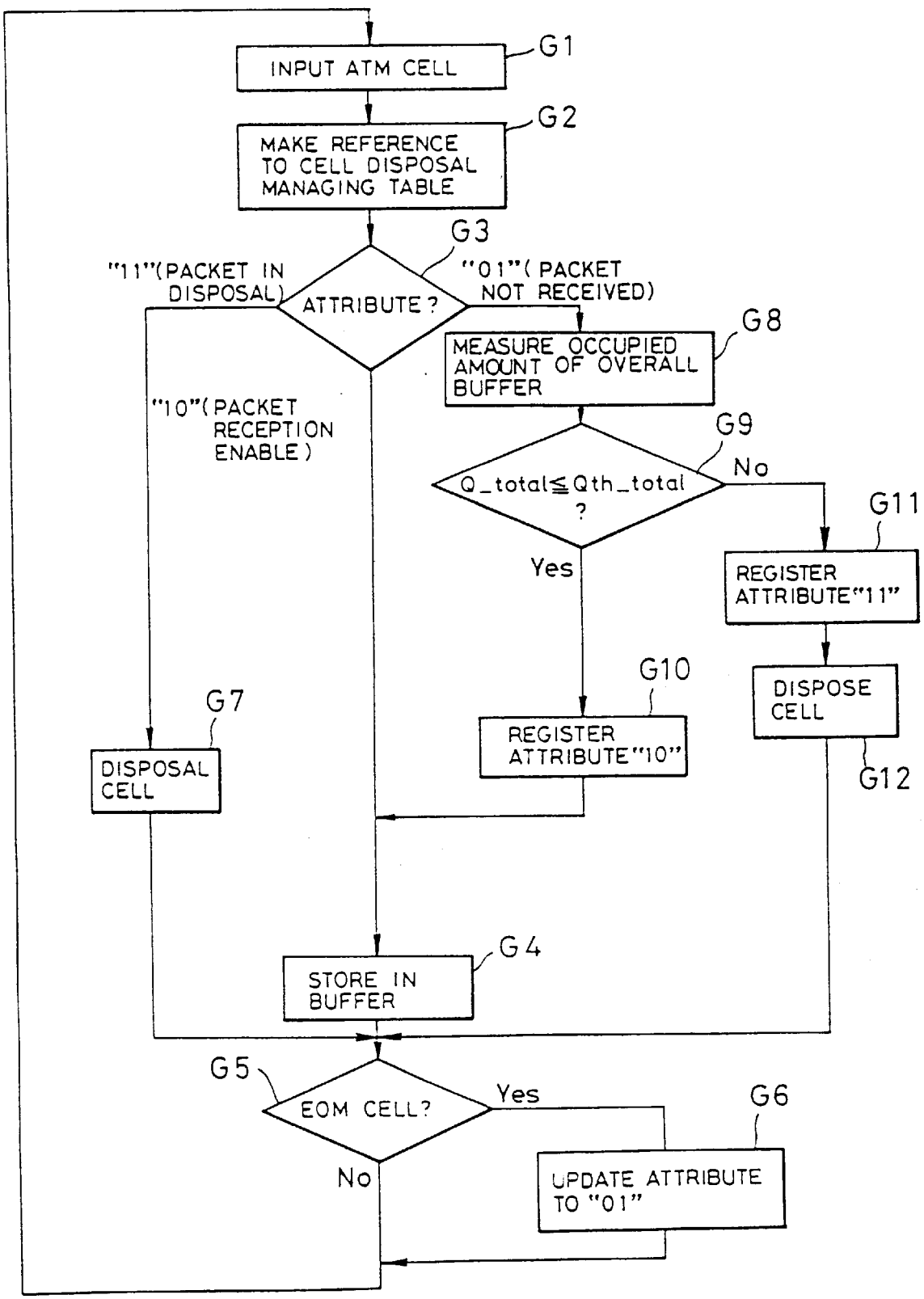
FIG. 16 is a flowchart showing a procedure of the conventional ATM cell buffer managing procedure.

Since the threshold value Qth_total set for overall buffer is 30, the number T of the logical channels (VC) in the state of "10" (packet reception enable) in the managing table 30 is 3, and the predetermined coefficient k is 0.5, the threshold Qth_total for the VC6 becomes Qth_vc=5 as calculated through the foregoing equation (2). On the other hand, the occupying amount Q_vc of the ATM cells of the VC6 in the cell buffer is 16 and thus is greater than the calculated threshold valve Qth_vc (=5). Therefore, it can be judged that the packet of the upper layer having the leading cell in question may cause overflow from the buffer to cause loss of several amount of cells. Then, "11" (packet in disposal) is set in the managing table 30 to dispose (drop) the leading cell in the cell input control portion 24 (FIG. 15B). All of the ATM cells of the VC6 are disposed (dropped) in the cell input control portion 24.

In the foregoing example of the second embodiment set forth above, the number T1 of the logical channel (VC) in the state of "10" (packet reception enable) in the managing table was used for calculating the threshold value for the individual logical channel (VC), stable selective packet disposal can be performed irrespective of the crowding level of the buffer even with using the number T2 of the logical channel (VC) having cells actually stored in the cell buffer.

As set forth above, according to the present invention, in the selective packet disposal per the logical channel (VC) in the buffer memory for temporarily storing the ATM cell, stable selective packet disposal can be performed irrespective of the crowding level of the bugger even with using the number T2 of the logical channel (VC) having cells actually stored in the cell buffer.

According to the present invention, since the process of the ATM cell can be determined with reference to the managing table before storing the ATM cell in the buffer so that the unnecessary ATM cells can be disposed before storing the buffer, for the logical channels (VC), for which the selective packet disposal is desired. Therefore, the ATM cells which should be disposed will never be stored in the buffer and subsequently never be fed to the network.

For the logical channels which is declared not to apply the selective packet disposal upon establishing the logical channel (VC) through a signalling process, "inapplicable" is set. On the other hand, for the logical channels which prefer to perform the selective packet disposal, "packet not received" is initially set so that selection of the logical channels (VC) requiring the selective packet disposal and the logical channel not requiring the selective packet disposal, can be done easily under the environment including the logical channel which requires transmission of the cells as much as possible irrespective of possibility loss of several packets, and a flexible network design can facilitated.

When the ATM cell of the logical channel having attribute of "packet not received", at first, the occupied amount of the overall buffer provided from the buffer occupied amount counting portion is compared with the predetermined threshold value. If the occupied amount of the overall buffer does not exceed the predetermined threshold value, "packet reception enable" is set for the corresponding logical channel.

On the other hand, if the occupied amount of the overall buffer exceeds, the threshold value for the individual logical channel (VC) is calculated on the basis of the occupied amount of the overall buffer, the number of the logical channels in the state of "packet reception enable" and the predetermined coefficient. When the buffer occupying amount provided from the buffer occupied amount counting portion 23 is in excess of the threshold value for the individual logical channels (VC), "packet in disposal" is set. Conversely, when the occupying amount of the logical channel is less than or equal to the threshold value for the individual logical channel, "packet reception enable" is set for the corresponding logical channel. As the concrete threshold value, a value derived by dividing the occupied amount of the overall buffer with the number of the logical channel in the state of "packet reception enable" to derive an average occupied amount and by multiplying the average occupied amount by the predetermined coefficient.

In the conventional method, since only control per packet irrespective of difference of the logical channel (VC), a problem in encountered in excessively disposing the packet in some logical channel. However, the present invention permits dynamic setting of the threshold value per logical channel. Thus, deviation of the forced disposal per logical channel can be successfully restricted.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. An ATM cell buffer managing system comprising:
    buffer memory means for temporarily storing an ATM cell;
    cell disposal managing table means for storing a reception enabling and disabling information indicating whether reception of said ATM cell per each individual logical channel is permitted or not;
    buffer occupied amount counting means for measuring occupied amount of an overall buffer of said buffer memory means when said reception enabling and disabling information of the logical channel of input ATM cell indicates reception enabling;
    reception control means for receiving said input ATM cell when a buffer occupied amount measured by said buffer occupied amount counting means is less than or equal to a first threshold value; and
    disposal control means for calculating a second threshold value for the logical channel of the input ATM cell when said buffer occupied amount exceeds said first threshold value and determining disposal or reception of said input ATM cell depending upon a result of comparison of a buffer occupying amount of said logical channel of said input ATM cell and said second threshold value.

2. An ATM cell buffer managing system as set forth in claim 1, wherein said disposal control means includes means for deriving a value as said second threshold value depending upon a quotient derived by dividing said buffer occupied amount with a number of all of logical channel, for which said reception enabling and disabling information indicates reception enabling.

3. An ATM cell buffer managing system as set forth in claim 2, wherein said second threshold value is derived by multiplying said quotient by a predetermined coefficient.

4. An ATM cell buffer managing system as set forth in claim 1, wherein said disposal control means includes means for deriving a value as said second threshold value by deriving a quotient by dividing said buffer occupied amount with a number of all of logical channel, for which said reception enabling and disabling information indicates reception enabling, and multiplying said quotient by a predetermined coefficient.

5. An ATM cell buffer managing system as set forth in claim 1, wherein said disposal control means includes means for deriving a value as said second threshold value by deriving a quotient by dividing said buffer occupied amount with a number of all of logical channel having ATM cells actually stored in said cell buffer, and multiplying said quotient by a predetermined coefficient.

6. An ATM cell buffer managing system in an ATM node equipment having a buffer memory for temporarily storing ATM cells, comprising:
    buffer occupied amount counting means for measuring an occupying amount of said ATM cells per each individual logical channel in said buffer memory;
    status storage means for storing a cell disposal managing table maintaining attributes indicative whether arriving ATM cell can be received or not per each individual logical channel;
    cell input control means for comparing an occupied amount of the overall buffer measured by said buffer occupied amount counting means with a predetermined first threshold value for determining whether said input ATM cell is to be received or disposed, and updating the content of said cell disposal managing table,
    said cell input control means receiving said input ATM cell when said occupied amount of the overall buffer is less than or equal to said first threshold value, calculating a second threshold value for the logical channel of said ATM cell when said occupied amount of the overall buffer exceeds said first threshold value and determining whether the input ATM cell is to be received or disposed depending upon a comparison of a buffer occupying amount of the logical channel of said input ATM cell and said second threshold value.

7. An ATM cell buffer managing system as set forth in claim 6, wherein said cell input control means derives said second threshold value by multiplying an average buffer occupied amount per all of the logical channels having attributes indicating reception enabling state by a predetermined coefficient.

8. An ATM cell buffer managing system as set forth in claim 7, wherein said status storage means sets for each individual logical channel in said cell disposal managing table one of a first attribute to be set when a selective packet disposal is not applied, a second attribute to be set when packet reception is enabled, a third attribute to be set when a packet is in disposal, and a fourth attribute to be set when the packet is not received in the case where the selective packet disposal process is applicable.

9. An ATM cell buffer managing system as set forth in claim 8, wherein said cell input control means is responsive to arrival of the ATM cell of the logical channel having said fourth attribute to compare said occupied amount of said overall buffer for making decision whether said ATM cell is to be received or disposed.

10. An ATM cell buffer managing system as set forth in claim 9, wherein said cell input control means sets said second attribute for said logical channel of said cell disposal managing table when said occupied amount of the overall buffer is less than equal to said first threshold value.

11. An ATM cell buffer managing system as set forth in claim 9, wherein said cell input control means compares said buffer occupying amount of the logical channel of the input ATM cell with said second threshold value when said occupied amount of the overall buffer exceeds said first threshold value.

12. An ATM cell buffer managing system as set forth in claim 11, wherein said cell input control means sets said second attribute of said logical channel when said buffer occupying amount of said logical channel is less than or equal to said second threshold value.

13. An ATM cell buffer managing system as set forth in claim 11, wherein said cell input control means sets the attribute of said logical channel to said third attribute when said buffer occupying amount of said logical channel exceeds said second threshold value.

14. An ATM cell buffer managing system comprising:

a buffer memory temporarily storing an ATM cell;

a cell disposal managing table, said table storing a reception enabling and disabling information indicating whether reception of said ATM cell per each individual logical channel is permitted or not;

a buffer occupied amount counter, said counter measuring an occupied amount of an overall buffer of said buffer memory when said reception enabling and disabling information of the logical channel of input ATM cell indicates reception enabling;

a reception controller, said reception controller receiving said input ATM cell when a buffer occupied amount measured by said buffer occupied amount counter is less than or equal to a first threshold value; and a disposal controller, said disposal controller calculating a second threshold value for the logical channel of the input ATM cell when said buffer occupied amount exceeds said first threshold value and determining disposal or reception of said input ATM cell depending upon a result of comparison of a buffer occupying amount of said logical channel of said input ATM cell and said second threshold value.

* * * * *